United States Patent [19]
Jeppsson

[11] Patent Number: 5,088,181
[45] Date of Patent: Feb. 18, 1992

[54] SHEET METAL PART MACHINING SYSTEM
[75] Inventor: Jan Jeppsson, Bellevue, Wash.
[73] Assignee: The Boeing Company, Seattle, Wash.
[21] Appl. No.: 595,254
[22] Filed: Oct. 9, 1990
[51] Int. Cl.$^5$ .............................................. B23Q 3/06
[52] U.S. Cl. .................................... 29/563; 83/452; 83/916; 409/219
[58] Field of Search ................. 409/235, 80, 219, 191, 409/202, 212; 29/563, 56.5, 564; 83/916, 452, 23, 460, 461, 402, 409, 588, 400, 453, 227, 466; 269/34, 20, 61, 73

[56] References Cited

U.S. PATENT DOCUMENTS

| | | | |
|---|---|---|---|
| 2,849,927 | 9/1958 | Daugherty . | |
| 2,892,388 | 6/1959 | Daugherty . | |
| 3,277,969 | 10/1966 | Vincent | 175/5 |
| 3,286,594 | 11/1966 | Kruse, Jr. | 90/11 |
| 3,413,893 | 12/1968 | Wilson | 90/17 |
| 3,494,253 | 2/1970 | Hood et al. | 269/20 |
| 3,523,485 | 8/1970 | Klein | 90/15 |
| 3,584,505 | 6/1971 | Seligmann | 73/133 |
| 3,648,514 | 3/1972 | Vilain | 73/100 |
| 3,650,178 | 3/1972 | Appleton | 90/15 |
| 3,664,229 | 5/1972 | Cary | 90/18 |
| 3,768,796 | 10/1973 | Campbell | 269/34 |
| 3,780,619 | 12/1973 | Kitamura et al. | 90/15 |
| 3,954,044 | 5/1976 | Ridgway | 90/21 |
| 3,964,355 | 6/1976 | Daniels | 269/20 X |
| 3,967,242 | 6/1976 | Isoo et al. | 340/146.3 |
| 4,158,987 | 6/1979 | Smith | 409/80 |
| 4,178,820 | 12/1979 | Gerber | 83/13 |
| 4,212,570 | 7/1980 | Larsson | 408/95 |
| 4,260,305 | 4/1981 | Clopton | 409/134 |
| 4,312,110 | 1/1982 | Averyanov et al. | 29/568 |
| 4,327,615 | 5/1982 | Gerber et al. | 83/49 |
| 4,346,444 | 8/1982 | Schneider et al. | 364/475 |
| 4,382,728 | 5/1983 | Anderson et al. | 409/137 |
| 4,437,150 | 3/1984 | Dahlgren, Jr. et al. | 364/474 |
| 4,443,141 | 4/1984 | Kosmowski | 409/163 |
| 4,466,069 | 8/1984 | Balfanz | 364/475 |
| 4,468,160 | 8/1984 | Campbell, Jr. | 409/202 |
| 4,478,538 | 10/1984 | Kakino | 408/6 |
| 4,523,749 | 6/1985 | Kindgren et al. | 269/73 X |
| 4,554,635 | 11/1985 | Levine | 364/475 |
| 4,561,814 | 12/1985 | Dahlgren, Jr. et al. | 409/80 |
| 4,579,321 | 4/1986 | Kawano | 269/61 |
| 4,589,317 | 5/1986 | Kawano | 83/409 X |
| 4,664,571 | 5/1987 | Takada et al. | 409/134 |
| 4,682,524 | 7/1987 | Achelpohl | 83/227 X |
| 4,700,308 | 10/1987 | Jones | 364/468 |
| 4,709,605 | 12/1987 | Clark | 83/23 |
| 4,787,787 | 11/1988 | Hopwell et al. | 409/219 |
| 4,793,230 | 12/1988 | Benuzzi | 83/466 |

FOREIGN PATENT DOCUMENTS

| | | | |
|---|---|---|---|
| 2802972 | 8/1978 | Fed. Rep. of Germany | 83/916 |
| 3024389 | 1/1982 | Fed. Rep. of Germany | 83/452 |
| 3626964 | 2/1988 | Fed. Rep. of Germany | 83/452 |
| 3832215 | 3/1990 | Fed. Rep. of Germany | 83/916 |
| 240699 | 11/1986 | German Democratic Rep. | 83/452 |

Primary Examiner—William Briggs
Attorney, Agent, or Firm—Bruce A. Kaser

[57] ABSTRACT

The machining system (10) disclosed here is particularly well-suited for automatically machining flat parts from individual sheets of aluminum. The system (10) includes a machining table defined by a pair of spaced-apart, parallely-extending table beams (18, 20). Clamping rails (192) mounted to each beam (18, 20) grip opposite side edges of an individual sheet (11) of aluminum, in a manner such that the sheet spans the distance between the beams (18, 20). The clamp rails are driven linearly relative to the beams, in order to move the sheet back and forth therebetween. Upper and lower carriage beams (14, 16) also extend transversely across the table beams (18, 20), one above the sheet (11), and the other below. The upper carriage beam (14) carries both a spindle carriage (28) and an upper clamp carriage (30). The spindle carriage (28) moves a cutting tool back and forth sideways relative to the sheet (11), and vertically up and down, for cutting parts from the sheet (11). Any part profile can be machined via the combined movements of the spindle carriage (28) and the clamp rails (192). The upper clamp carriage (28) carries the upper half (133) of a clamping mechanism (131). The lower half (135) of the clamping is carried by a lower clamp carriage (170) that moves along the lower carriage beam (16) below the sheet (11). Both halves cooperatively stabilize the sheet (11) during machining. All three carriages (28, 30, 170) move independently of each other, but are controlled cooperatively for machining parts from the sheet (11).

25 Claims, 17 Drawing Sheets

SHEET METAL PART MACHINING SYSTEM

TECHNICAL FIELD

This invention relates to milling machines and similar kinds of machine tools. More particularly, it relates to a machine tool that is specifically adapted for machining parts of various shapes from thin metal sheets.

BACKGROUND INFORMATION

In the aircraft or airplane industry, the manufacture of relatively small sheet metal parts ($2 \times 2$ inches up to $4 \times 10$ feet) represents a majority of the total number of all parts manufactured. The methods of making such parts in practice today are basically the same as the methods used thirty or forty years ago, the only difference being that in some cases numerically-controlled (NC) machines have been substituted for manually-controlled ones.

At best, those NC machines which have been developed thus far are semi-automatic in nature, because an operator is always required for loading/unloading operations, maintenance, etc. No fully-automated system has yet to be developed which can make the wide variety of different airplane parts required for the typical commercial jet.

Airplane sheet metal parts are generally cut from flat aluminum sheets ranging in size from $4 \times 6$ feet to $4 \times 12$ feet. Many of the flat parts cut from such sheets are subsequently formed into various shapes corresponding to their intended use as an airplane part. At present, three types of primary systems are used to make airplane sheet metal parts. These include blanking presses, stack router systems, and hand-routing systems.

Blanking presses are well-known as they are very common in the sheet metal industry. Their disadvantages are also well known. Mainly, they are expensive and inefficient because they require high-quality hard tooling, and setup of such tools is time consuming relative to the short run times for the number of parts pressed during a given lot run.

The typical stack router involves first stacking a plurality of sheets, and then mounting them on a caul-plate of three-quarter inch plywood, or the like. Generally, the sheets are mounted to the plywood by screws. After mounting, the profiles around each part are machined, typically by hand-control.

One disadvantage associated with the stack router system is that the resultant parts have poor edge quality and undesirable burrs. This is primarily caused by high temperatures during the cutting process, which is unavoidable because such system creates a situation where high rates of metal removal generate heat that cannot be adequately dissipated by the inherently ineffective cooling of stacked sheets.

Another disadvantage associated with the stack router is that no machining of individual sheet surfaces can be done since several sheets are stacked one on top of another. Specifically, this prevents counter-sinking or chamfering on individual sheet surfaces. A further disadvantage is that after all parts have been profiled, the stack must thereafter be removed from the caul plate, which is a labor-intensive process.

Hand-routing is another common process utilized in making sheet metal parts. This process simply requires an operator to cut each individual part using a hand-held router that is forced against a template. It goes without saying that such process is labor intensive, and also requires unique template tools for each part, both things tending to make it a costly process.

Because of the various inefficiencies associated with the above-described systems, there has been a long-felt need to develop new systems that are either fully automated or at least have a higher degree of automation than the above systems. However, this goal has been difficult to realize, mostly because airplane sheet metal parts differ in many ways from sheet metal parts used in other industries. These differences are attributable to not only the physical characteristics of the parts manufactured, but also the total volume of parts manufactured relative to the total number of part types required.

For example, although airplane sheet metal parts are mostly aluminum, several different alloys of aluminum are actually used, each having its own unique characteristics depending on part type requirements. Of these, when considering or developing automated part-making machines, it is important to consider the condition (hard or soft) of any given alloy when it is formed into a part.

Generally, the hard or tempered condition of an aluminum alloy is known as the "T" condition, and the soft condition is known as the "O" condition. Airplane parts are sometimes machined while in the "O" condition, because in such condition their softness enables them to be later formed or shaped without cracking. After forming or shaping, such parts are then subjected to heat treatment, which gives them the necessary strength for their intended structural purpose. Unfortunately, heat treatment can create part distortions and warpage, resulting in substantial hand labor for later straightening of these parts.

An alternative soft condition for an aluminum alloy is known as the "W" condition. This is an unstable condition, except for when the alloy is kept at very low temperatures (typically minus 10 degrees F). Exposing an aluminum alloy to room temperature while in the "W" condition will cause the material to gradually cure to a hard condition. However, it takes time for this to happen, and it is possible to expose "W" aluminum sheets to temperatures as high as 50 degrees F. for several hours, for example, and the material will not have enough time to harden appreciably.

It would be preferable to form airplane parts while in the "W" condition because, after each part is formed, it can then be allowed to slowly cure at room temperature, thus obtaining a desired hard condition without significant warpage and/or distortion. In order to do this, it is necessary, as a practical matter, to have the capability of both machining and forming quickly at higher temperatures closer to room temperature, because it is difficult to conduct such operations at temperatures as low as $-10$ degrees F.

For this reason, prior to the development of the invention disclosed here, cutting and then forming in the "W" condition has not been feasible. It has been impossible to remove flat sheets from cold storage, and machine blanks and other stock from them using the above-described systems, and then either form the machined parts or place them back in cold storage quickly enough so that the "W" condition is maintained. That is one of the significant advantages of the present invention. That is to say, the invention provides for extremely fast machining of flat parts in the "W" condition.

Sheet metal parts for commercial jets range in size from as small as $1 \times 1$ inch up to $4 \times 12$ feet. Ninety percent of the total volume of parts required in airplane manufacturing falls within the much-narrower range previously mentioned, i.e. 2×2 inches up to 10×20 inches. However, the labor spent on such parts is not proportionate to the 90% volume figure. Instead, perhaps 40 to 50% of the total labor spent in sheet metal part fabrication is used to produce 90% of the parts by volume. The remaining 60 to 50% of the total labor is used to produce the remaining 10% of the part volume. This is mostly caused by the time required for tooling set-up of the latter, since their size/shape is different from the majority of parts.

Therefore, in addition to a long-felt need to develop machining systems that can work with parts in the "W" condition described above, it is also important to develop automation methods that do not rely on part-type tooling, but instead are controlled by data created for each part type, thus making it easy for the same machining system to machine a variety of parts by using only standardized tools.

A machining system that works in this way makes it easy to add, amend or substitute the data for any given part type. The result is quick and easy set-up when switching from one part type to another, creating substantial time and labor savings. As will become apparent, the present invention provides such a system, and is one that has long been needed in the airplane manufacturing industry.

Before the specific details of the invention are described, it is first appropriate to mention that a machine system built in accordance with the invention is particularly well-suited to be used in conjunction with punch-nibbler and sheet deburring machines as part of an overall sheet metal fabrication facility. The underlying idea with the machine system disclosed here, and the other two just mentioned, is to process as many parts as possible while they are contained together, or nested, on a single sheet of standard size (four by six, or four by twelve feet in the examples described above).

Briefly, and by way of explanation, a punch-nibbler machine is a commercially-available machine that performs the following functions: hole punching, including round, rectangular, polygonal holes, etc.; dimpled or extruded holes, such as holes formed with rims around their periphery; louvers; threaded holes; stamping of part numbers and/or similar marks; notches or cut-outs of various shapes; and rough cuts along the periphery of a part. In some cases, a punch-nibbler can be used to make a finish cut along a part's periphery.

It is typical that a punch-nibbler be used to make rough, periphery cuts, especially for larger parts, i.e. a sequence of slightly overlapping holes either with a curved, oblong punch aligned as closely as possible to the part's profile. If the part is not designed to be used in a sonic area of the airplane, the part's edge may not need subsequent machining. However, such parts may still need to be deburred via a sheet deburring machine.

Typical deburring machines have scotch-brite (TM) type brushes that remove small burrs from part surfaces. In the case of clad aluminum, for example, where a mirror finish must be retained on the part, it is not possible to employ a deburring machine's brushes. In such situations, parts that have first been run through a punch-nibbler machine could be left in place in the larger sheet, held by bridges or tabs, and thereafter processed in the machining system disclosed here. This is a further advantage of the invention in that it is possible to use it for machining burr-free edges in certain situations.

As will become apparent, a machining station in accordance with the invention can perform various machining operations, including profile cutting, either directly or as a finish cut after nibbling; breaking of sharp profile edges; machining on sheet upper and lower surfaces, including countersinking, counterboring, chamfering, face milling, grooving, etc.; hole reaming to precision tolerance; part-making, for assisting automation in subsequent processes; and tab cut-off for releasing parts onto an output conveyor. These various aspects of the invention, which make it well-suited for use in a large-scale part-making facility, along with the other machines described above, will become apparent upon review of the disclosure set forth below.

SUMMARY OF THE INVENTION

The invention disclosed here provides a system for machining parts from relatively thin sheets of aluminum, and the like. A system in accordance with the invention has a table defined by a pair of spaced-apart, parallelly-extending table beams. A sheet metal workpiece is supported by the table beams, and spans the distance between them. To accomplish this, each beam respectively has a side clamping rail that attaches to one side edge of the sheet. Independently operated long-side servodrives cooperatively move each clamping rail back and forth along the table beams in unison, which correspondingly moves the sheet back and forth in one linear direction between and parallel to the beams.

A pair of upper and lower carriage beams laterally or transversely span the distance between the table beams, both above and below the workpiece. The upper beam supports or carries a pair of independently movable tool and clamp carriages, while the lower beam supports or carries just a clamp carriage, although it is capable of also supporting a tool carriage, if need be. The movement of all of such carriages relative to each other is independently controlled by servodrives, although they are controlled cooperatively in order to machine parts from the workpiece.

The tool carriage mounted to the upper carriage beam slides along a pair of horizontally-extending guide rails on the beam. It consists of essentially two tool support plates or members. The first plate is mounted directly to the guide rails just mentioned. The second one is mounted to a pair of vertically-extending guide rails that are attached to one face of the first plate. In this manner, the second plate may move upwardly or downwardly relative to the first.

The second plate carries a machine spindle that includes a cutting tool operable to cut or machine parts from the workpiece. Moving the first plate along the carriage beam also carries the second plate horizontally back and forth in a lateral direction over the workpiece. At the same time, however, the second plate may move upwardly or downwardly for the purpose of adjusting the vertical height of the machine spindle. This provides two degrees of freedom of movement relative to the workpiece. A third degree of freedom of movement is provided by the above-described long-side servodrives which move the clamping rails along each table beam.

The clamp carriage is similar to the tool carriage in that it also has a first support plate, or a carriage support plate, mounted to the horizontally-extending guide rails on the upper carriage beam, and a second carriage support plate slidably mounted to vertical guide rails on the first plate. However, the second plate also carries a pair of transversely-extending guide rails which project forwardly relative to the upper carriage beam. Slidingly mounted to the latter rails is a third carriage support member which carries an upper clamping tool. Such tool is operable to stabilize the position of the workpiece relative to the spindle cutting tool carried by the tool carriage, from above the workpiece. All of the previously-described moving parts on both the tool carriage and the clamp carriage are moved along linear axes by rack and pinion servodrive mechanisms.

The lower clamp carriage is mostly a mirror image of the upper clamp carriage, except that the lower clamp carriage is positioned on the lower carriage beam below the workpiece. The lower clamp carriage also supports a clamping tool that jointly operates from below with the clamping tool of the upper clamp carriage, the two carriages cooperatively defining a clamping mechanism. That is to say, both clamp carriages operate to stabilize the workpiece during milling.

Each clamping tool on each carriage has a pressure foot. In the case of the upper carriage, the pressure foot is downwardly depending or downwardly thrusting. Conversely, in the case of the upper carriage, the pressure foot is generally upwardly extending or upwardly thrusting. Both pressure feet have air bearings that assist in stabilizing the workpiece during machining operations.

A machining system in accordance with the invention has several significant features that are unique. For example, the fact that the workpiece is supported or suspended between spaced table beams, and does not rest on an underlying bed, has several processing advantages.

First, it allows a spindle-driven cutting tool or cutter to be moved perpendicularly relative to a sheet in a reciprocating motion while part edges are cut or profiled. This prevents heat buildup on one point of the cutter, which avoids melting the sheet material and therefore reduces formation of burrs. It also keeps the cut edge cooler, which prevents a condition called "overaging." As is well-known, the latter may lead to crack formation in the formed part.

Second, supporting the workpiece between table beams also makes the surfaces of the workpiece accessible for machining and marking from both above and below, and enables a chamfering tool to be mounted on the clamp carriages, if desired, to break sharp corners at the same time as a part is cut from the workpiece.

Third, chips resulting from the machining process are easy to collect and dispose of, since a left-hand flute cutter can be used that forces chips downwardly where they can be collected underneath the sheet.

Fourth, the table makes it easy to provide a space for underlying conveyors which can automatically receive cut parts from underneath the sheet, and then move them to other processing locations.

Another significant feature of the invention is that it does not require either a heavy bed or a heavy gantry that must be positioned with high precision and accurate orthogonality. This makes a machining system in accordance with the invention easy to build and of low cost.

The above-summarized carriages can be relatively low in mass, weighing fifty to one hundred pounds, as opposed to the two to three thousand pounds which are common for conventional gantries and supporting beds.

This means smaller servomotors and gear boxes can be used for moving carriage parts, all of which further lowers tooling costs, and increases reliability. Furthermore, the low moving mass of the carriages allows more rapid and accurate machining of contours, even with small radii, because higher accelerations/decelerations can be applied easily on lower mass carriages.

Also, orthogonality errors are easy to keep small because only the portions of the clamping rails described above which are close to the upper and lower carriage beams need to be perpendicular to those beams. Lastly, the major table frames can be easily braced to a floor or other foundation since no moving gantry is required. This, together with low mass carriages, provides high performance of servodrive systems since structural resonances may be kept above the band width of any servodrive mechanism.

Other advantages and features of the system summarized above will become more clearly understood upon consideration of the following description, which is to be taken in conjunction with the drawings.

BRIEF DESCRIPTION OF THE DRAWINGS

In the drawings, like reference numerals indicate like parts throughout the various views, unless indicated otherwise, and wherein.

BEST MODE FOR CARRYING OUT THE INVENTION

I. System Description

Figure 1:
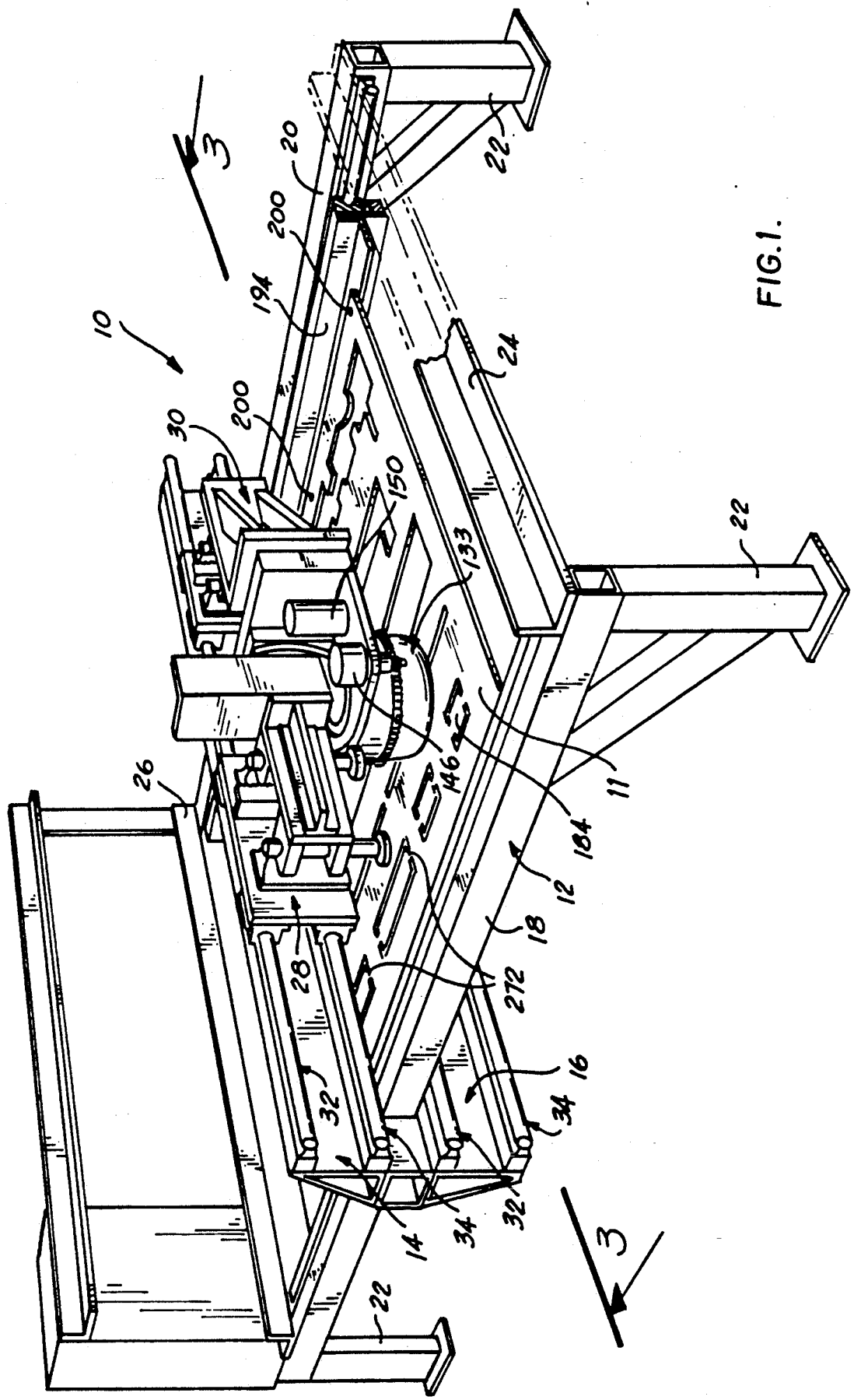
FIG. 1 is a pictorial view of a preferred embodiment of a sheet metal part machining system in accordance with the invention.

In the drawings, and referring first to FIG. 1, therein is shown at 10 a sheet metal part machining system constructed in accordance with a preferred embodiment of the invention. The system 10 includes a table 12 that supports upper and lower horizontally-extending carriage beams 14, 16. The beams 14, 16 are suitably mounted to a pair of parallel table beams 18, 20, and extend across the space between the table beams. The carriage beams are fixedly connected to the table beams 18, 20 and do not move relative thereto.

The table 12 is mountable in any location suitable for machining parts by four vertical legs 22. The laterally-spaced table beams 18, 20, which support a workpiece 11, are also interconnected by L-shaped beams 24, 26 at opposite ends of the table 10.

Figure 13:
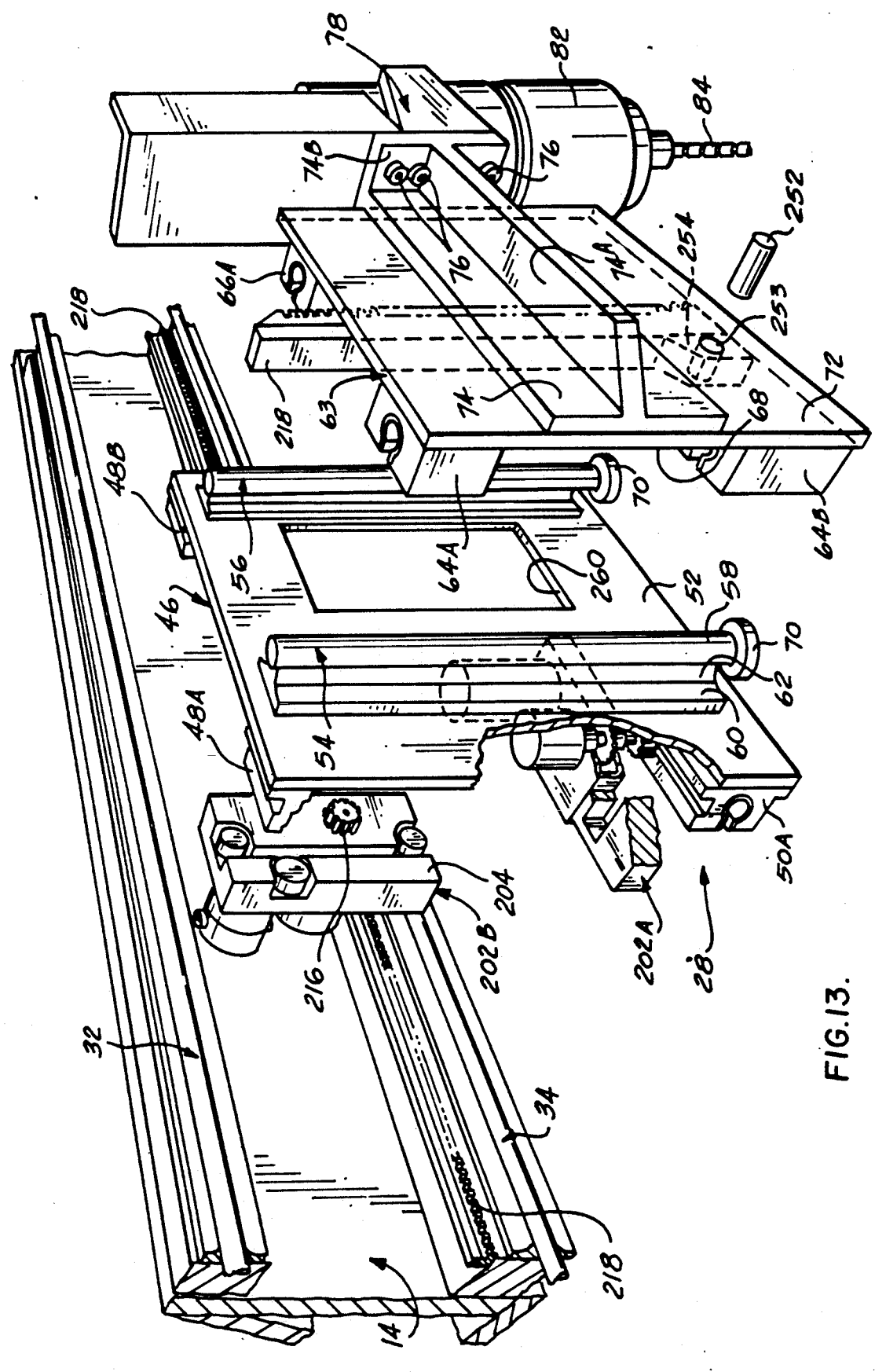
FIG. 13 is a view similar to FIG. 2, but is an exploded pictorial view of the system's upper carriage beam and associated carriage structure for the system's cutting tool.
Figure 14:
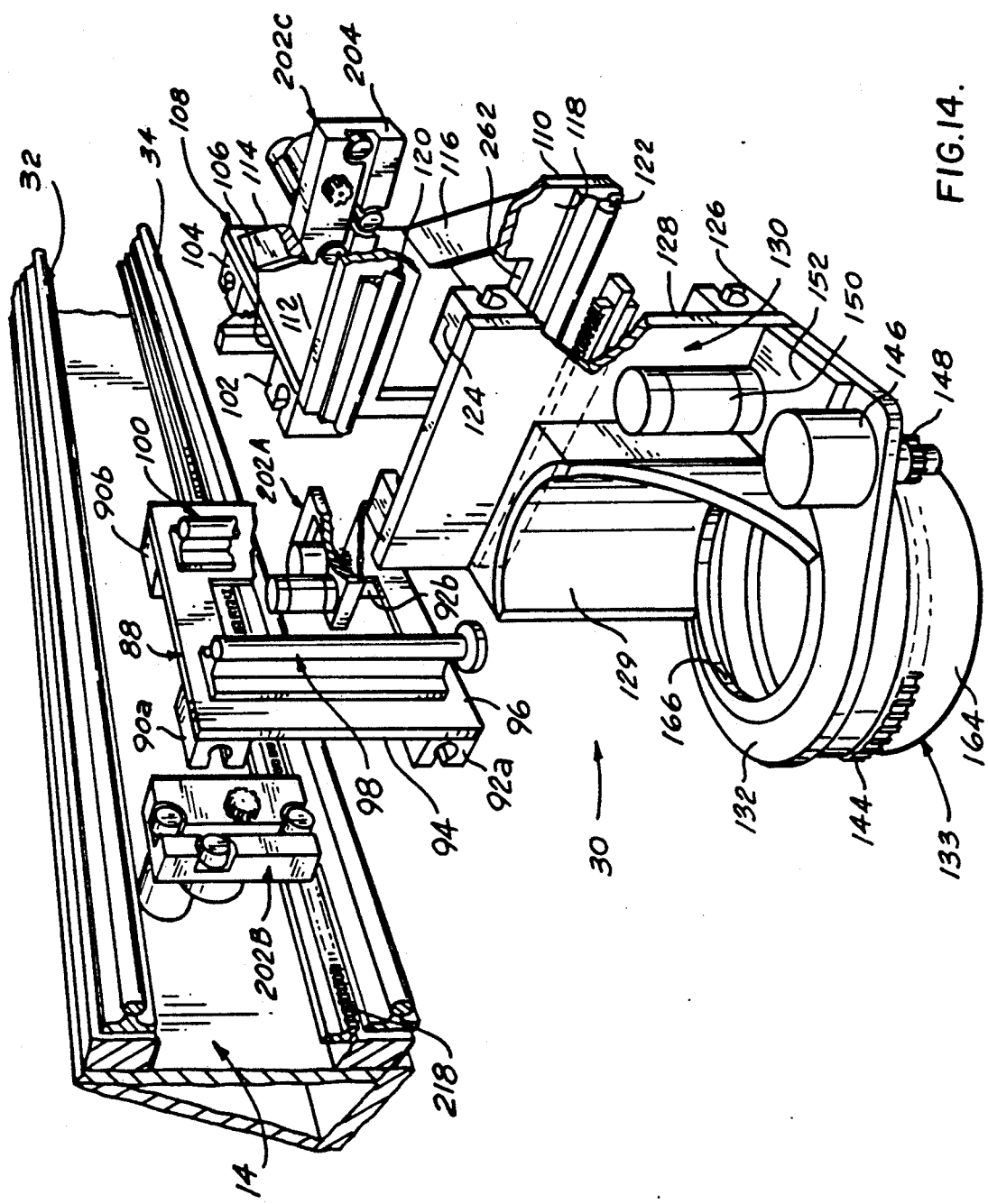
FIG. 14 is also a view similar to FIG. 2, and like FIG. 13, provides an exploded view showing the system's upper carriage beam and associated carriage structure for the system's upper clamping mechanism.

The table's upper carriage beam supports a spindle carriage, indicated generally at 28 (see FIG. 13), and a clamp carriage, indicated generally at 30 (see FIG. 14). Referring first to the spindle carriage 28 shown in FIG. 13, the manner by which carriage 28 is mounted to upper carriage beam 14 will now be described.

Upper carriage beam 14 has a pair of parallel, horizontally-extending guide rails 32, 34. Preferably, each one of such rails 32, 34 has a generally circular guide portion 36, or "axis-way." Such portion 36 is connected to a base 38 by a transversely-extending neck 40 that runs along and in between axis way portion 36 and base 38. This configuration is better seen in FIG. 15, and it is to be appreciated that such configuration is a standard machine component, although other equivalent configurations could be used.

The rail's base 38 is further mounted to a horizontally-extending rectangular beam 42 that is attached to the forward face 44 of upper carriage beam 14. Of course, and as is evident from the reference numeral designations in FIG. 15, and the other Figs. in accompaniment hereto, the structural makeup of both upper and lower guide rails 32, 34 is identical, except for the fact that the upper guide rail 32 is mounted to the carriage beam's forward face 44, near the top of the beam, while the lower guide rail 34 is mounted adjacent the lower end of beam face 44.

Figure 15:
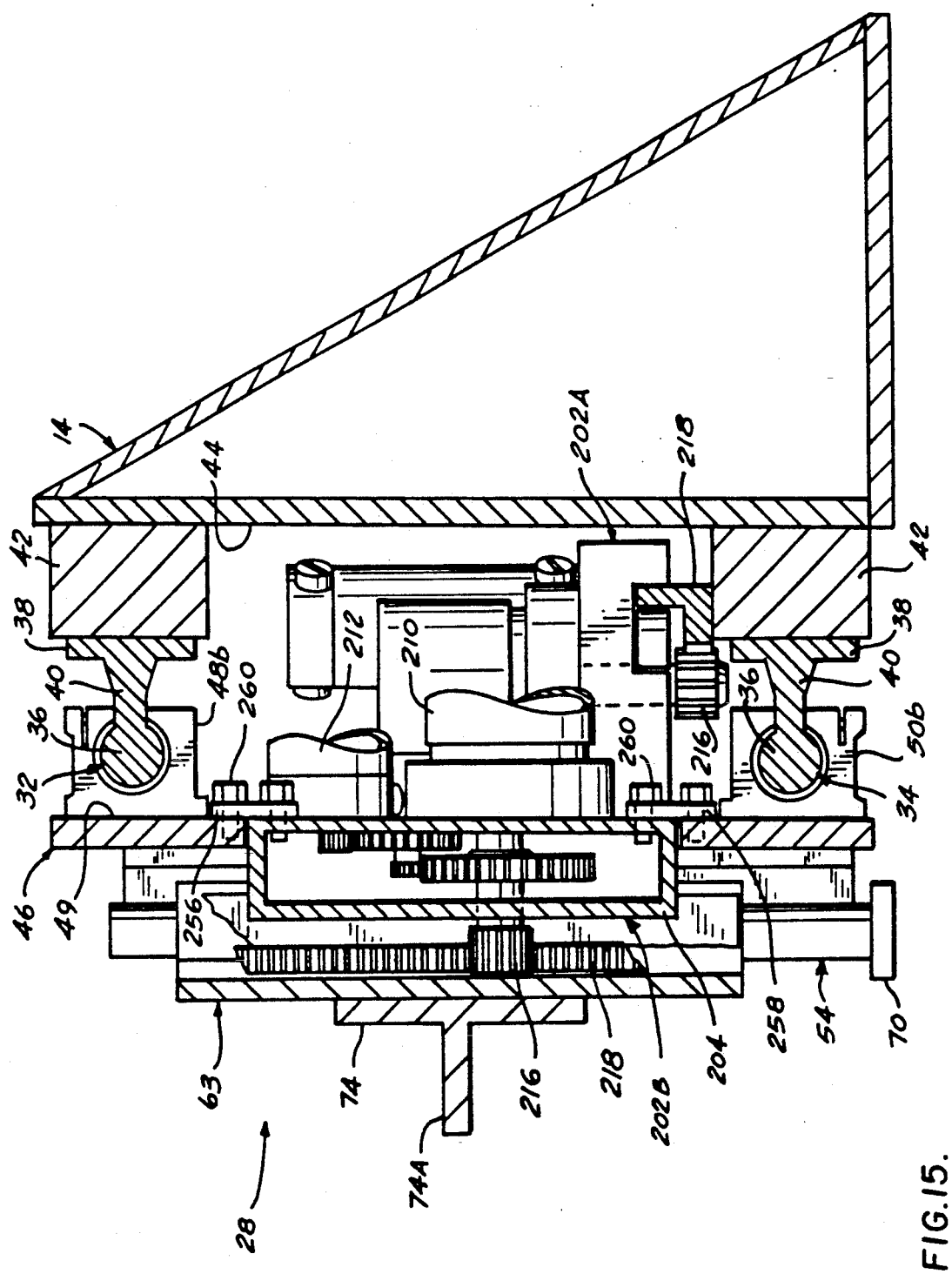
FIG. 15 is a side cross-sectional view of the upper carriage beam and associated carriage structure of the machining system shown in FIGS. 1-5, and is taken along line

Referring again to FIG. 13, mounted to horizontal guide rails 32, 34 is a first machine tool support plate, which is indicated generally at 46. Mounted to the back of support plate 46 are an upper pair 48a, 48b, and a lower pair 50a, 50b, of ball bushings adapted to ride, respectively, along upper and lower horizontal guide rails 32, 34. Once again, this arrangement is best seen in FIG. 15. The mechanism for moving tool support plate 46 along rails 32, 34 will be described at a later time.

Referring back to FIG. 13, mounted to the forward face 52 of the machine tool support plate 46 are a pair of vertically-extending guide rails, indicated generally at 54, 56. Like the horizontal rails 32, 34 previously described (which are mounted to upper carriage beam 14), the latter vertical rails 54, 56 each have a circular axis-way portion 58 connected to an elongated base 60 by a neck 62.

The spindle carriage 28 further has a vertical or second tool support plate 63, which is much like the first tool support plate 46 just described. Unlike the first plate 46, however, the second plate 63 has two pairs of vertically-aligned ball bushings 64a, 64b, 66a, 66b mounted to its rearwardly facing surface 68. The left pair of bushings 64a, 64b are in sliding engagement with the left vertical rail 54, the latter being mounted directly to the first plate 46. Similarly, the right pair 66a, 66b is in sliding engagement with vertical rail 56. Both of such vertical rails 54, 56 have a circular flange 70 at their lower ends which prevent tool support plate 63 from sliding downwardly off the rails.

Mounted to the forward face 72 of the second tool support plate 63 is a horizontally-extending tool-mounting bracket 74.

Such bracket has a forwardly-projecting, centrally-located stiffener portion 74a, and a mounting flange 74b. Conventional machine screws 76 connect a tool-mount 78 to flange 74b.

Figure 5:
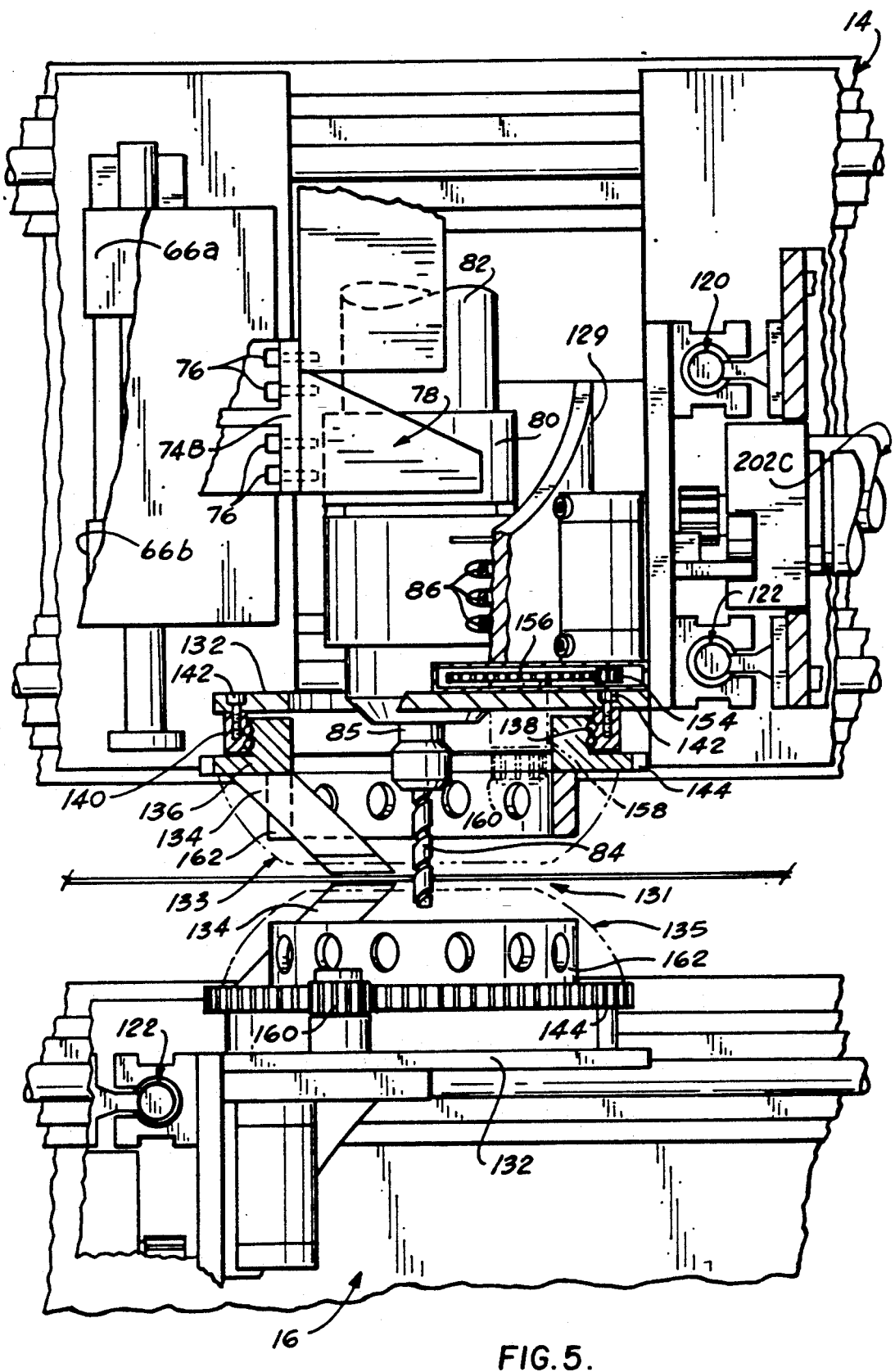
FIG. 5 is a further enlarged view of the carriage and spindle structure shown in FIG. 4, and shows a cutting tool or cutter for machining a workpiece.
Figure 6:
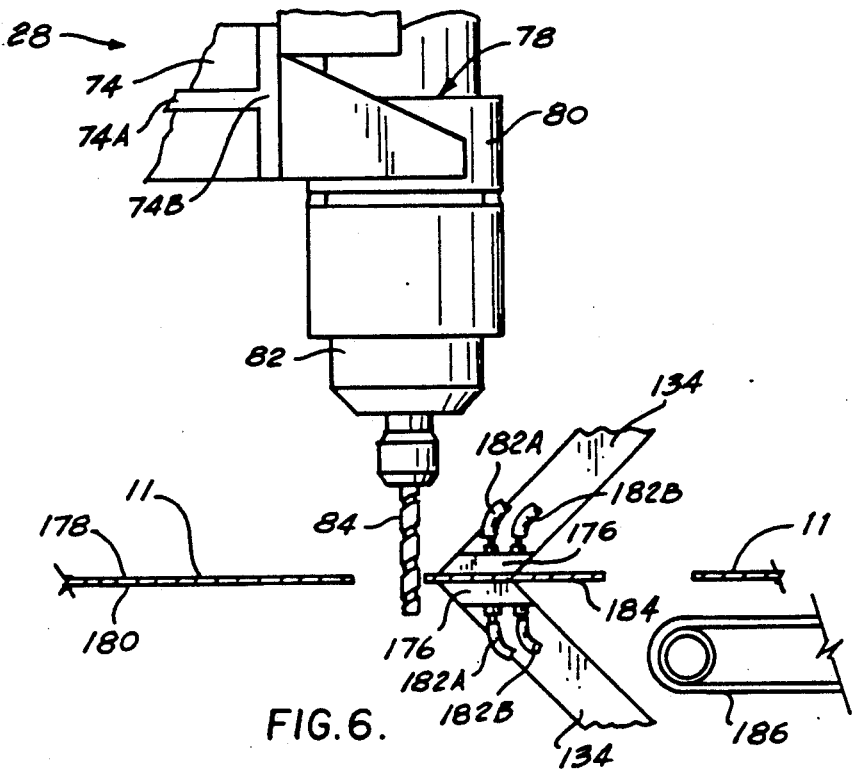
FIG. 6 is the first of a series of four schematics showing the operation of the machining system's clamping mechanism, and shows such mechanism gripping a portion of a sheet metal workpiece adjacent a rotating cutting tool.
Figure 16:
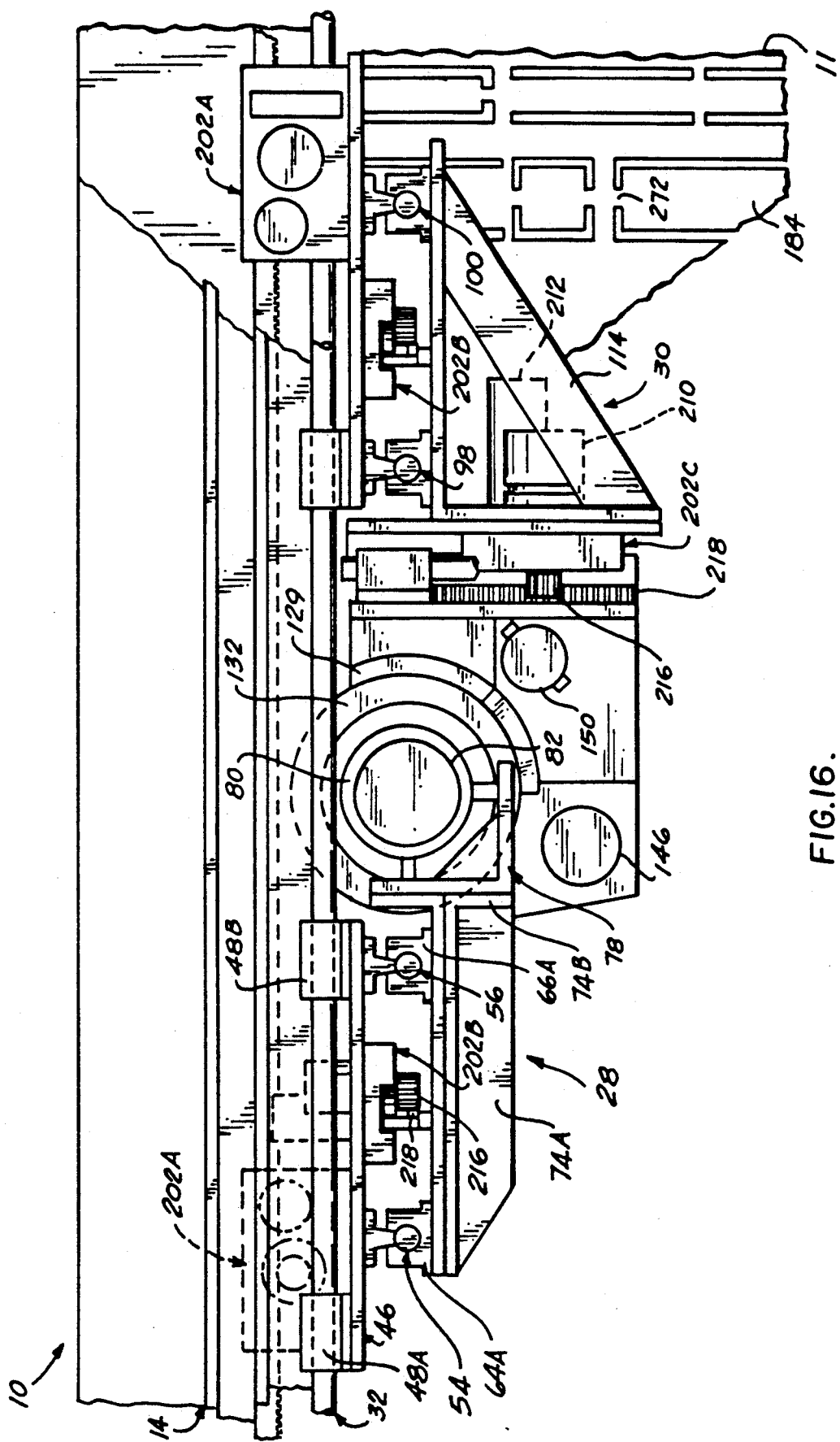
FIG. 16 is a top plan view of the machining system's upper carriage beam and associated carriage structure.

The tool-mount 78 is perhaps best seen in FIGS. 5 and 16. Preferably, it includes an encircling motor clamp 80 that grips a spindle drive motor 82, the latter in turn driving a cutting tool 84 in rotation (see FIG. 5). The motor clamp 80 is fixedly connected to tool-mount 78, and its grip around motor 82 is tightened or loosened by machine screws 86.

As should be apparent, the previously-described first and second tool plates 46, 63 (see FIG. 13), and the spindle tool-mounting structure 74, 78 (see FIG. 5), all cooperate to define a system of moving components that makes up tool carriage 28, for mounting cutting tool 84 to the upper carriage beam 14. The horizontally-extending guide rails 32, 34, mounted directly to beam 14, provide for horizontal movement of cutting tool 84 relative to the workpiece 11 that is to be machined by system 10 (see FIG. 1). The vertical guide rails 54, 56, mounted to the first tool support plate 46, provide for vertical movement of the cutting tool 84 relative to the workpiece 11. The various drive mechanisms used to physically accomplish either horizontal or vertical movement will be described later, because an identically operating mechanism is used to actuate each and every linear movement of the machining system 10 as described herein.

FIG. 14 illustrates the various separate components making up clamp carriage 30. Like the tool carriage 28 shown in FIG. 13, clamp carriage 30 also has a first plate-like member, or a first clamp carriage support plate 88, mounted to guide rails 32, 34, by upper and lower ball bushings 90a, 90b, 92a, 92b. The latter operate the same way as the ball bushings 48a, 48b, 50a, 50b previously described above, except, of course, that the latter are instead mounted to the rear surface 94 of plate 88.

Mounted to the forward surface 96 of first carriage plate 88 is a pair of vertically-extending guide rails 98, 100, the latter being in engagement with ball bushings 102a, 102b, 104a, 104b that are mounted to the back surface 106 of a second clamp carriage support plate 108. The latter plate 108 is L-shaped, and has a forwardly-projecting portion 110 making up one-half of the "L." Such portion 110 is perpendicular to the rear portion 112, and the two portions 110, 112 are interconnected by buttressing bars 114, 116.

Mounted to an inner lateral side 118 of the L-shaped plate's forwardly projecting portion 110 are a pair of forwardly or transversely-extending guide rails 120, 122. These are in sliding engagement with ball bushings 124, 126 that are mounted to the rear surface 128 of a third clamp carriage support plate 130.

Fixedly attached to the latter plate 130 is a horizontal support plate 132 which carries the upper half 133 of the system's clamping mechanism 131. This is best seen in FIG. 5. A curved buttressing support 129 also interconnects horizontal plate 132 and the third carriage support plate 130 just described. This is best seen in FIG. 14.

The clamping mechanism 131 of the system 10 consists of the upper half 133 just mentioned, and a lower half 135. As will become apparent, the lower half 135 is identical in construction to the upper half 133, except that lower half is positioned below workpiece 11. Each half 133, 135 has a pressure foot 134 mounted for rotation to support plate 132. This is accomplished by a circular turret 136 mounted via a ring bearing 138 to an annular mount 140. The latter 140 is fixedly connected to horizontal support 132 by machine screws 142.

Positioned around the periphery of turret 136 is a ring gear 144 that is driven in rotation by a motor 150 (see FIGS. 5 and 14). The motor 150 is mounted to a gear box 152 that is fixedly connected to the top of plate 132. Received within such gear box 152 is a gear 154 that is mounted to the motor's shaft. This gear 154 is engaged with a larger circular gear 156, that is drivingly connected, via a shaft 158, to a third gear 160. The latter gear 160 is in engagement with and drives the turret ring gear 144. A position sensor such as an encoder 146 determines the position of each pressure foot 134 relative to its circular path of travel, as defined by the rotation of turret 136 inside annular mount 140. This encoder 146 has a circular drive gear 148 in engagement with the teeth of ring gear 144, and rotates in response to any ring gear rotation caused by drive motor 150.

Fixedly connected to turret 136 is a downwardly-depending cylindrical member 162 (upwardly depending in the case of lower clamping mechanism 135). Seated over such member is a plastic bowl 164 that rides adjacent the workpiece 11 during the milling or cutting of parts therefrom. Such bowl 164 is open at the bottom. Horizontal support plate 132 in the upper clamping mechanism 133 has a circular opening 166 extending downwardly through turret 136. The tool drive motor 82 and spindle is normally positioned so that the spindle-driven cutting tool 84 extends downwardly through such opening in the manner shown in FIG. 5 (the spindle itself is indicated by reference numeral 85). As will become apparent, the tool carriage 28 is driven independently from the upper clamp carriage 30, and there is no physical connection between the two. However, each carriage 28, 30 is driven in close cooperation with the other, so that no part of tool drive motor 82 collides with plate 132, or its curved buttressing support 129.

Figure 4:
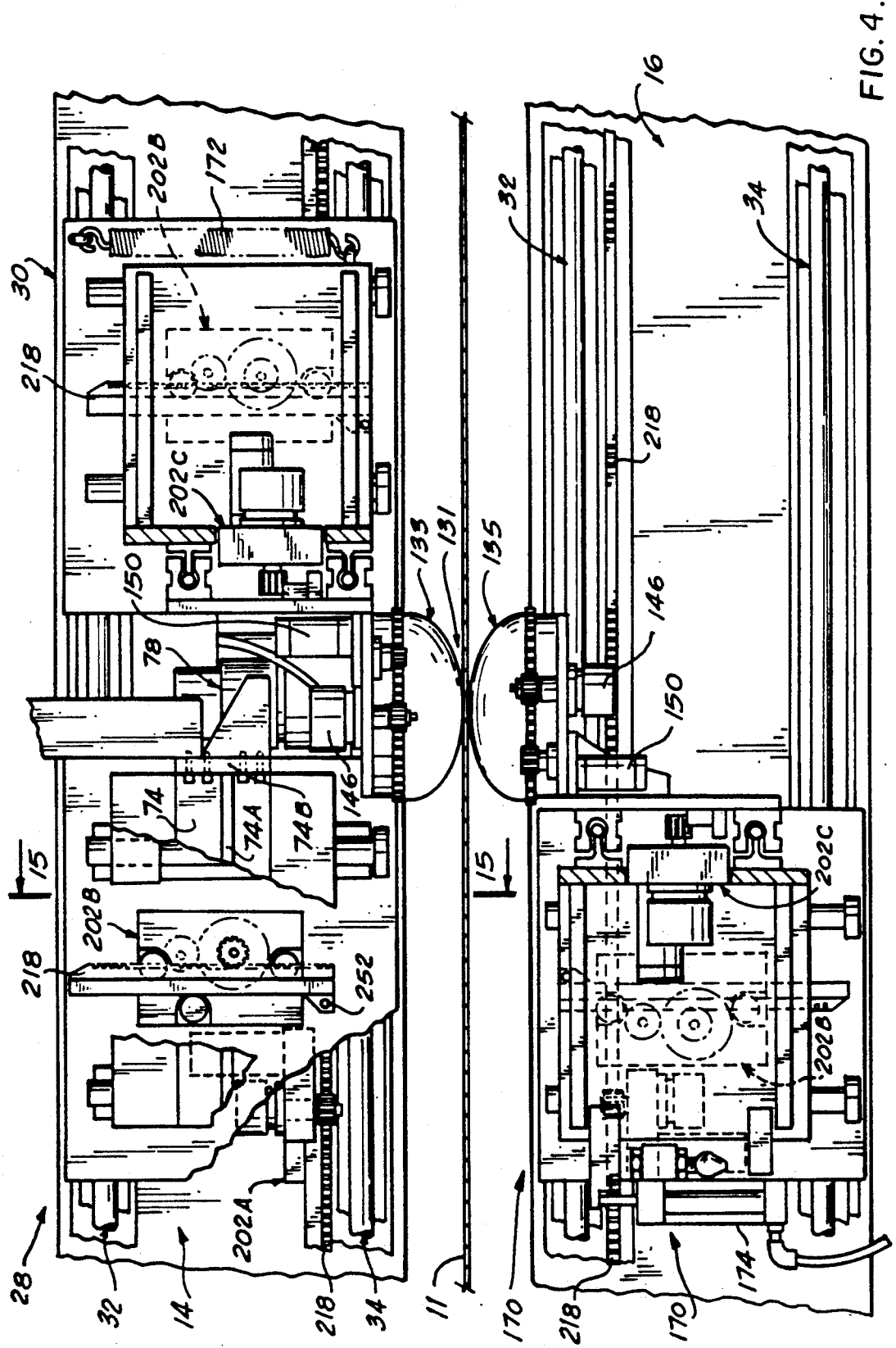
FIG. 4 is an enlarged view of the beam and carriage structure shown in FIG. 3.

Referring now to FIG. 4, it is seen that the system 10 also has a lower clamp carriage, indicated generally at 170, which carries the lower half 135 of the system's clamping mechanism 131. The lower carriage 170 is identical in nearly all respects to the upper clamp carriage 30 just described. That is to say, the various support plates, and sets of guide rails are identical, and have been identified with identical reference numerals. The lower clamp carriage 170 is, of course, slidingly mounted to the lower carriage beam 16 previously described, which has horizontally-extending rails 32 that are identical to the previously-described rails 32, 34 mounted to the upper carriage beam 14. One difference between the upper and lower clamp carriages 30, 170 lies in the way they are counterbalanced. The upper clamp carriage 30 has a spring 172 connected in tension between such carriage's first and second carriage support plates 88, 108. The tension in spring 172 pulls against the weight of all carriage components carried by plate 108, and reduces the wear and tear on the servodrive mechanism which adjusts the vertical height of the carriage's pressure foot 134.

For a similar reason, the lower clamp carriage 170 has a conventional air piston 164 that interconnects plates 88 and 108, but pushes upwardly against the weight of plate 108 and the components carried thereby. This similarly eases the wear and tear on the servodrive mechanism which adjusts the vertical height of the lower carriage's pressure foot 134.

Referring now to FIGS. 6-9, the pressure feet 134 of the upper and lower halves 133, 135 of the system's clamping mechanism 131, each have air bearings 176 on their lower surfaces. The upper and lower clamp carriages 30, 170 which move, respectively, along upper and lower carriage beams 14, 16 are manipulated so that their pressure feet 134 are positioned adjacent the upper and lower surfaces 178, 180 of workpiece 11. The air bearings 176 just mentioned have openings (not shown in the drawings) that are positioned adjacent workpiece surfaces 178, 180 during cutting or machining. Such openings are in communication with air supply hoses 182b, which either deliver pressurized air or create a vacuum.

Figure 7:
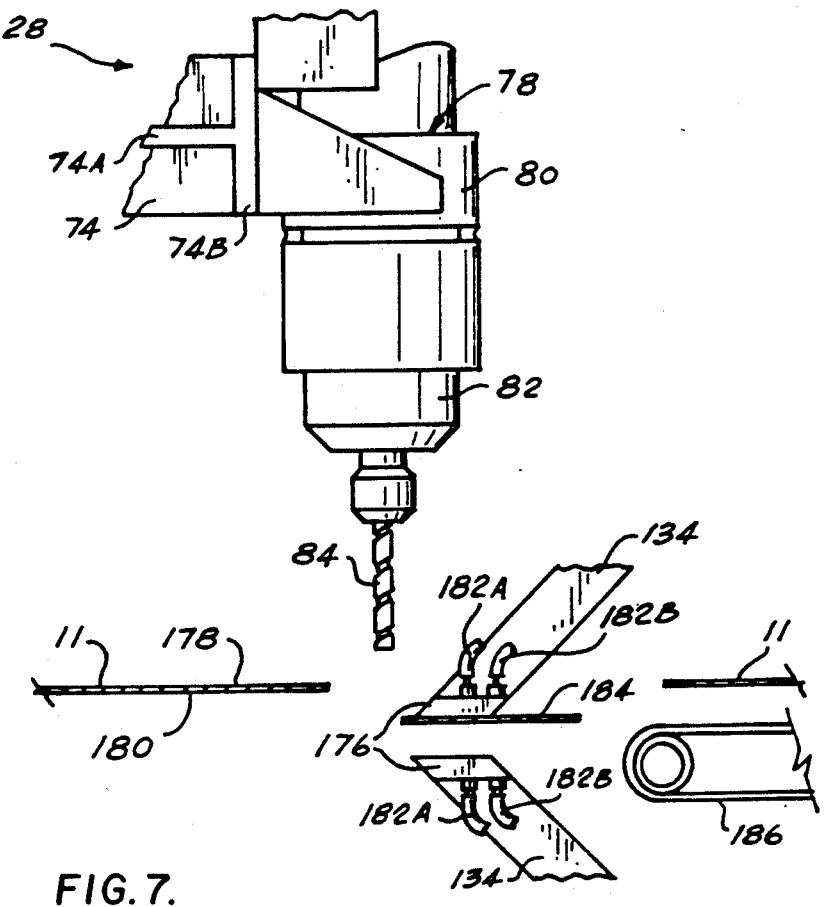
FIG. 7 is a view like FIG. 6, and is the second in a series of four similar views, but shows the clamping mechanism moving away from the cutting tool for the purpose of placing a machined piece on a moving conveyor.
Figure 8:
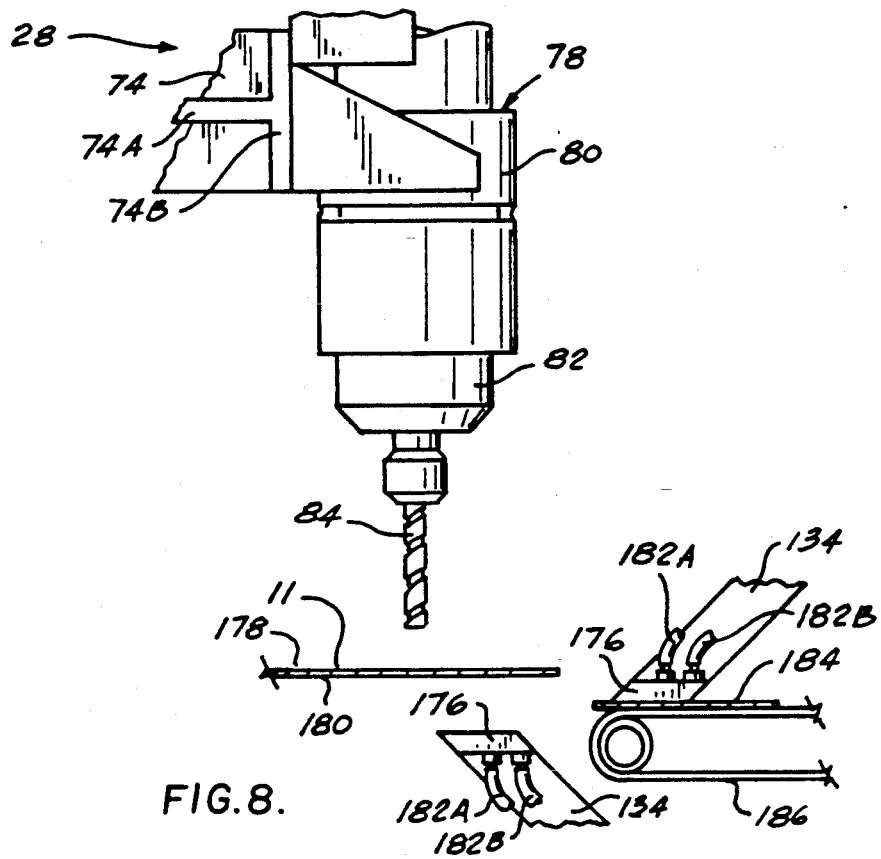
FIG. 8 is the third in a series of four views, and shows the machined piece placed on a moving conveyor.
Figure 9:
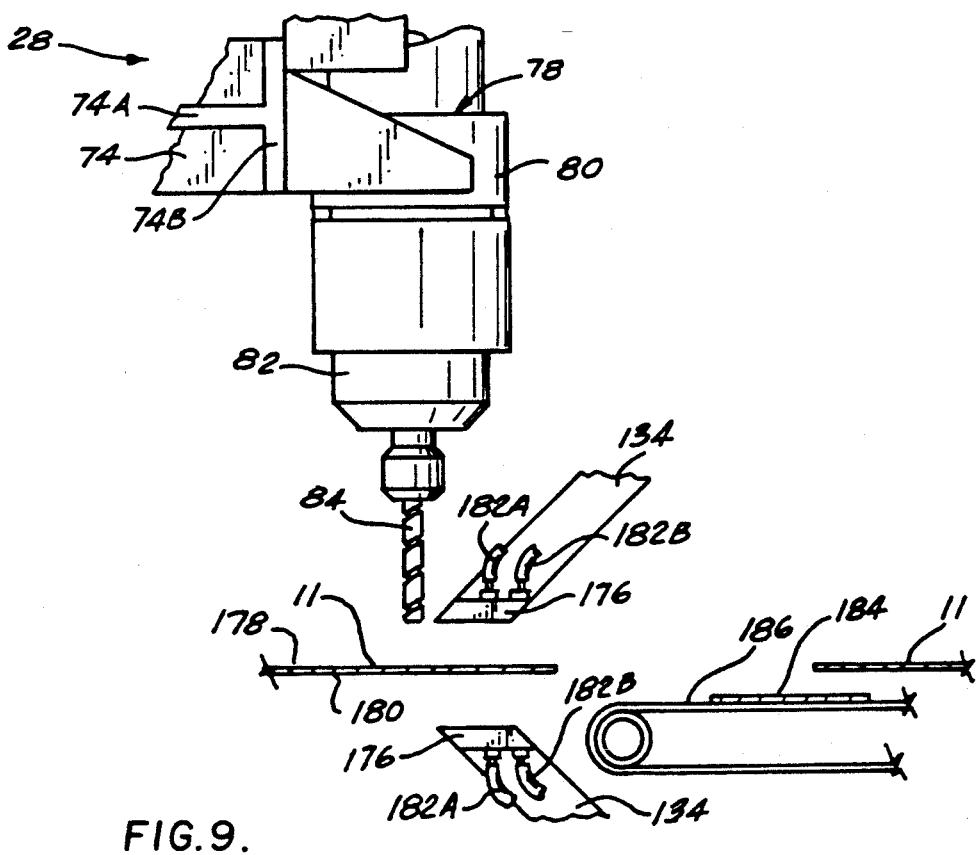
FIG. 9 is the fourth in a series of four views, and shows the clamping mechanism returning to a position adjacent the system's cutting tool for machining another piece.

During a typical machining operation, pressurized air is preferably delivered through hoses 182b, so that the pressure feet 134 can slide over workpiece surfaces 178, 180 as the cutting tool 84 transversely moves in one direction or another while cutting the normal profile of a part 184. When the part 184 has been completely machined or milled from the workpiece, as shown in FIG. 7, a vacuum is preferably then applied through hose 182b, so that the upper pressure foot 134 can hold the part 184, and move it away from the workpiece 11. It is conceivable, by way of example only, that the system 10 will be used as one station of a fully-automated machining/forming system, where individual parts 184 out by the system 10 from a workpiece 11 are thereafter placed on a moving conveyor 186, for moving such parts 184 elsewhere for further processing. This is best illustrated in FIG. 8. FIG. 9 shows the system's pressure feet 134 returning to an initial position for machining or cutting another part from workpiece 11.

Figure 3:
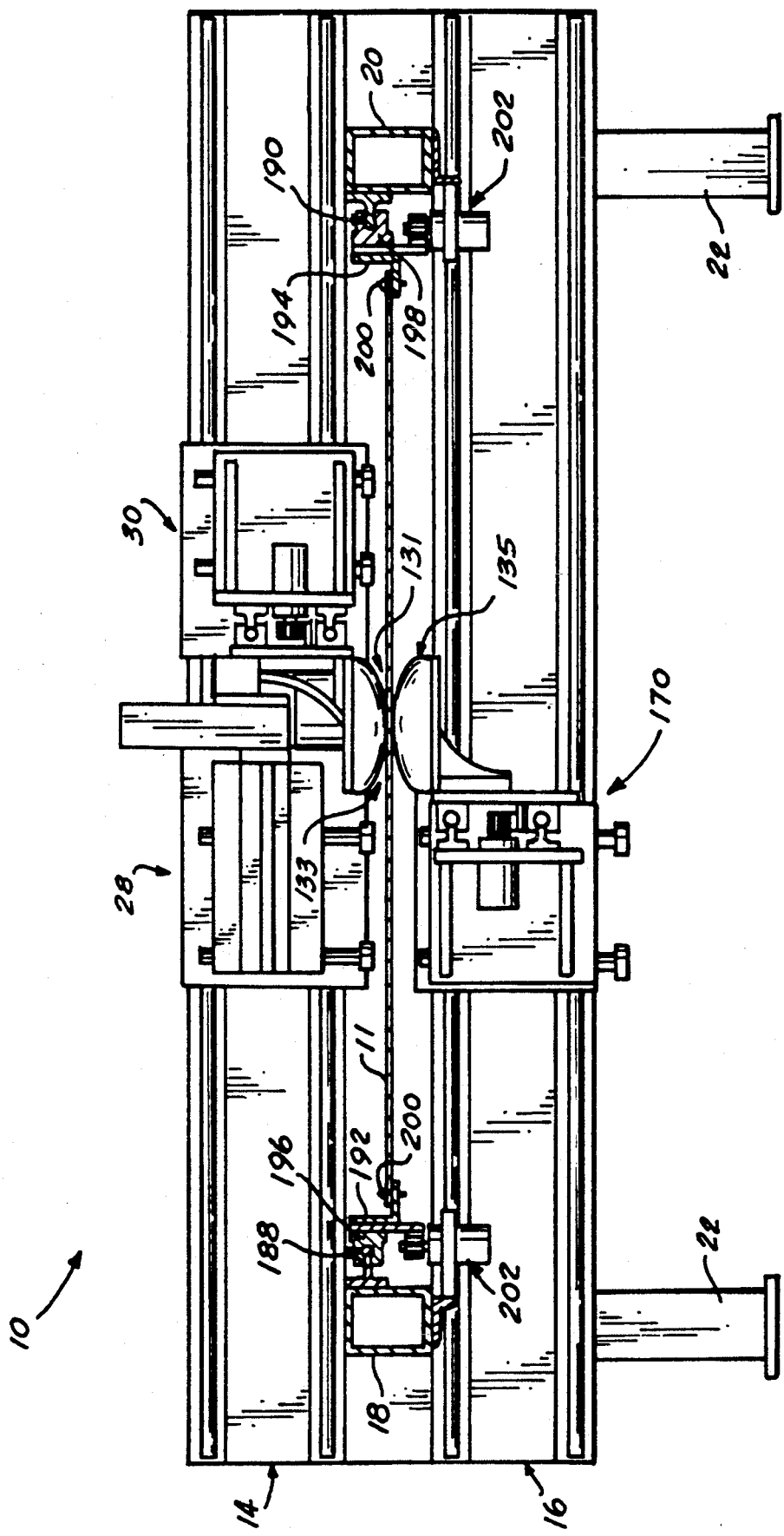
FIG. 3 is a frontal view of the system shown in FIG. 1, and is taken along line 3—3 in FIG. 1.

As should be apparent by now, it is important that the various moving components described above be controlled with precision and accuracy. The system 10 as described above has several linear axes along which one component slides relative to another. Referring to FIGS. 1 and 3, for example, two of such axes are defined by a pair of table guide rails 188, 190 which extend along the inner lateral sides of table beams 18, 20. Each of such guide rails 188, 190 is identical in construction to the horizontally-extending guide rails 32, 34 shown in FIG. 15 and described above.

The table guide rails 188, 190 have the purpose of moving workpiece 11 back and forth along the length of table beams 18, 20, in accordance with the length of any given part 184 that is to be out from the workpiece 11. Elongated clamping rails 192, 194 are mounted, respectively, to table rails 188, 190 by means of ball bushings 196, 198, similar to those previously described for the tool and clamp carriages 28, 30, 170.

In other words, each clamping rail 192, 194 is positioned on opposite lateral sides of workpiece 11. The lateral side edges of workpiece 11 are fixedly attached to the clamping rails 192, 194 by fasteners 200, so that the workpiece spans the distance between table beams 16, 18.

The horizontally-extending side rails 32, 34 mounted, respectively, to upper and lower carriage beams 14, 16 collectively provide three other axes of linear, horizontal movement laterally across workpiece 11. That is to say, tool carriage 28 and clamp carriage 30 each move independently along guide rails 32, 34 of the upper carriage beam 14. Similarly, the lower clamp carriage 170 moves along guide rails 32, 34 mounted to the lower carriage beam 16, such movement likewise being independent of the upper tool and clamp carriages 28, 30.

Each independently-moving carriage 28, 30, 170 has vertically-extending guide rails that define two further linear axes of movement. Once again, vertical guide rails 54, 56 (see FIG. 13) enable the second support plate 63 of tool carriage 28 to move vertically relative to the first support plate 46 of the same carriage. Vertical guide rails 98, 100 of clamp carriage 30 (see FIG. 14) work in the same way, as do the identical guide rails of the lower clamp carriage 170. Further, the transversely or forwardly-extending guide rails 120, 122 (see FIG. 14), which are mounted to the second support plate 108 of the system's upper and lower clamp carriages 30, 170, provide still another two linear axes of motion.

Figure 17:
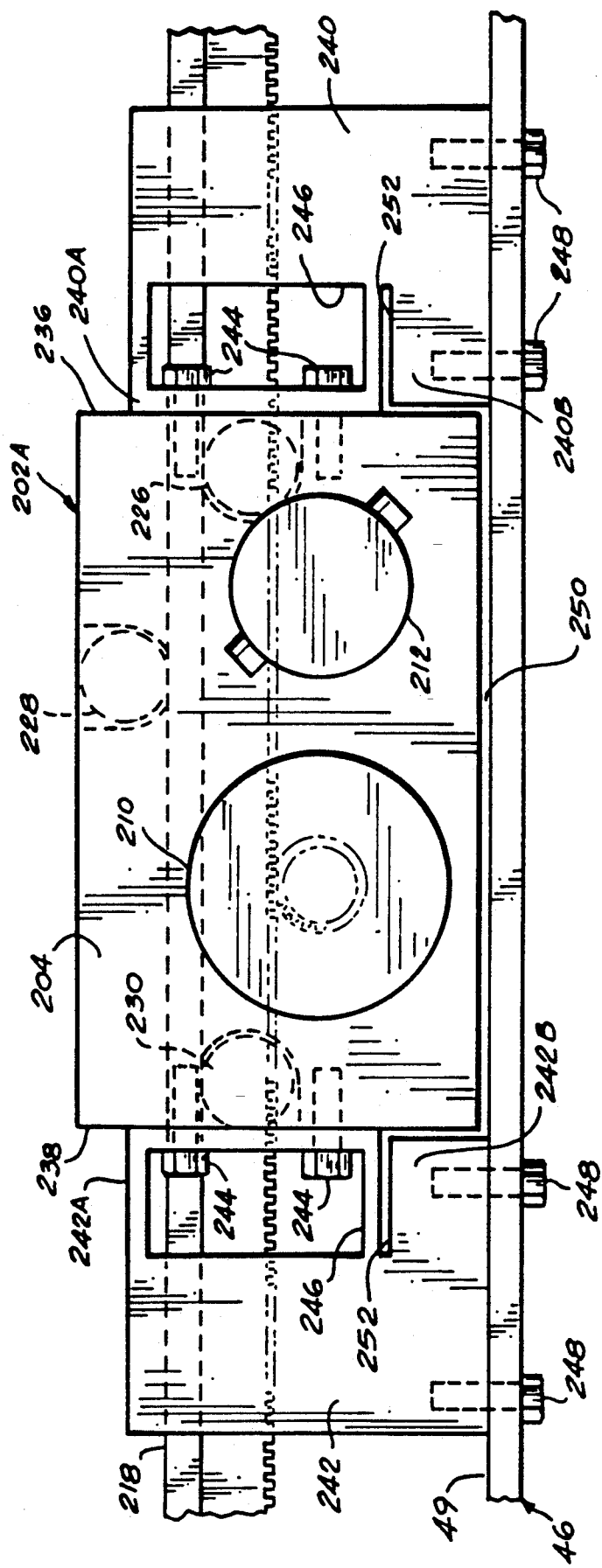
FIG. 17 is a bottom plan view showing a servo-drive mechanism like the mechanism of FIGS. 10-12, for moving a carriage along the upper carriage beam shown in FIGS. 1-5 and 13-16.
Figure 18:
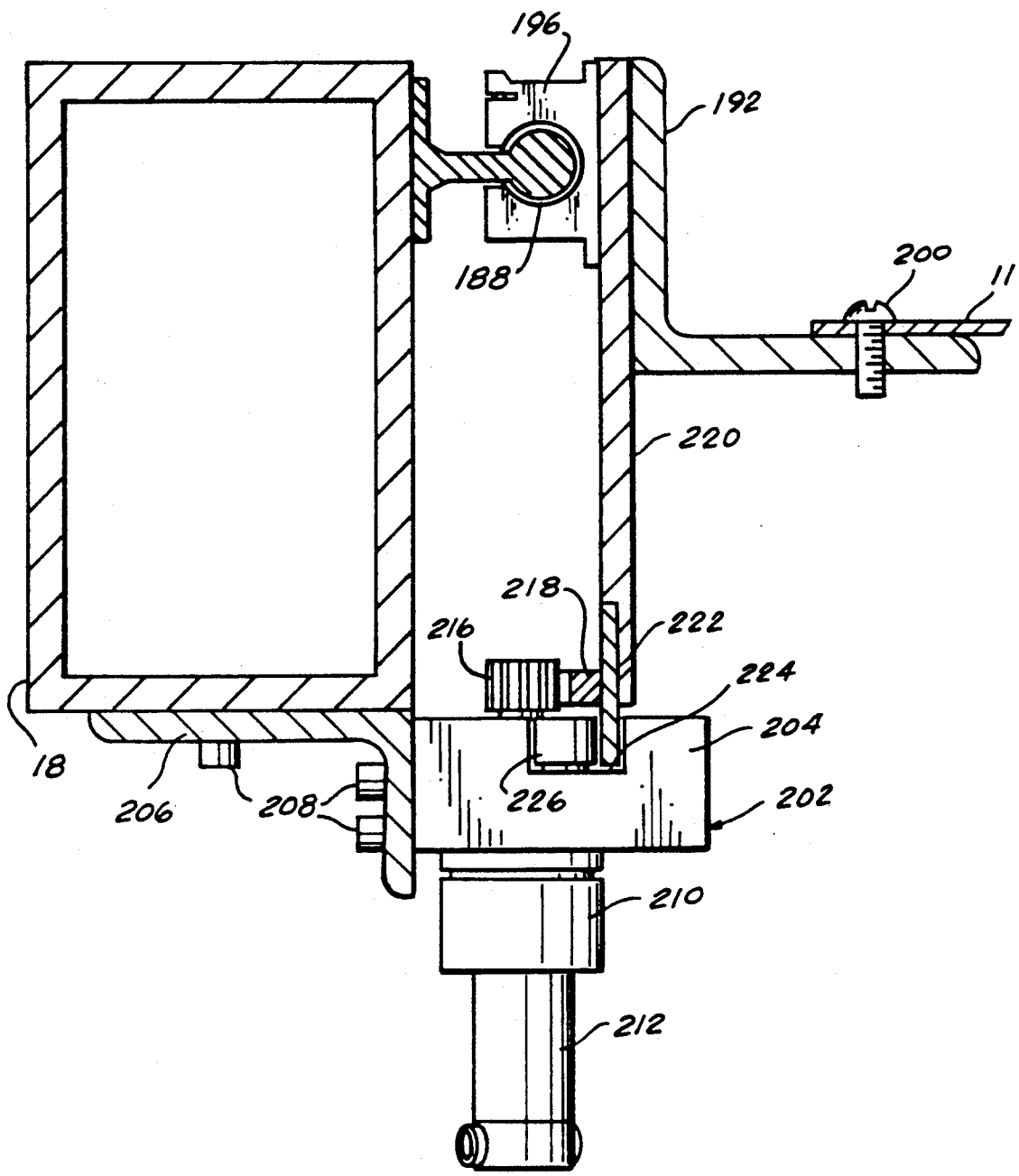
FIG. 18 is a cross-sectional view taken through one of the machining system's parallel table beams, and illustrates use of a servo-drive mechanism like the mechanism shown in FIGS. 10-12 for moving a sheet metal workpiece back and forth relative to the system's upper and lower carriage beams.

Referring now to FIGS. 10-12, 17 and 18, and first to FIG. 18, the servodrive mechanisms which move system components along the linear axes just mentioned will now be described. FIG. 18 is a cross-sectional view of table beam 18, and clamping rail 192 on the left-hand side of the system 10 (see FIG. 1 for reference). Shown mounted to the bottom side of beam 18 is a servodrive mechanism, indicated generally at 202, that is constructed in accordance with a preferred embodiment of the invention.

The mechanism 202 includes a generally rectangular gear box 204. In FIG. 18, the gear box 204 is shown mounted to beam 18 by an L-shaped bracket 206. Conventional machine screws 208 fasten gear box 204 to one flange of bracket 206, and the other flange of the bracket to beam 18.

Figure 11:
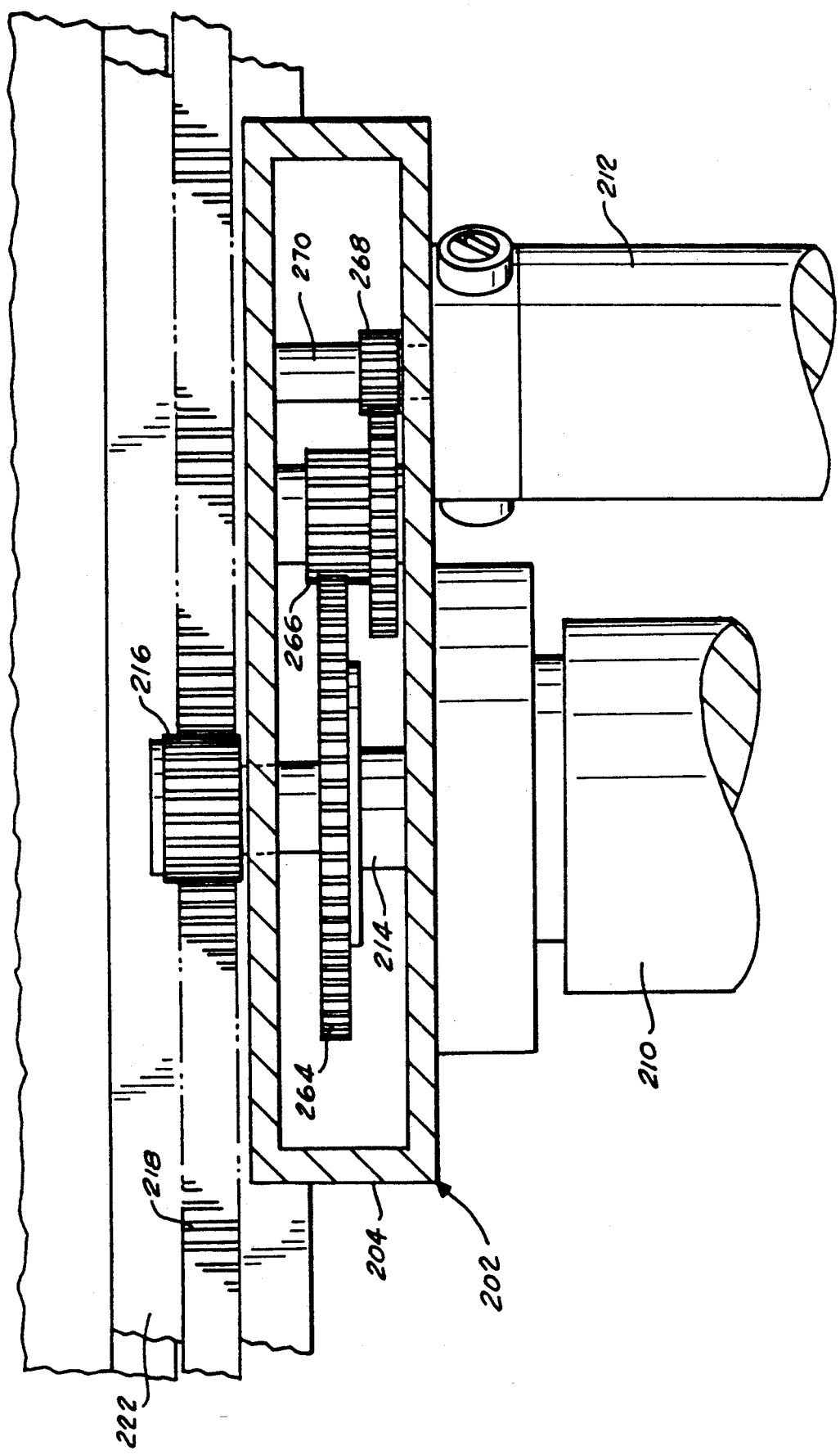
FIG. 11 is a side view of the servo-drive mechanism shown in FIG. 10, and is taken along line 11—11 in FIG. 10.

Referring now to FIG. 11, mounted to one side of the servodrive's gear box 204 are an encoder 210 and a servomotor 212. Encoder 210 has a shaft 214 that extends through the width of gear box 204. Mounted to the end of the shaft, on the other side of gear box 204, is a pinion gear 216. The teeth of such gear are in engagement with the teeth of an elongated rack gear 218.

Referring again to FIG. 18, rack gear 218 is fixedly attached to a vertically-upright plate 220 that is part of clamping rail 192. Since the gear box 204 of servodrive mechanism or servodrive 202 is fixedly connected to beam 18, when the servodrive motor 212 rotates pinion gear 216 (the gear connection between servodrive motor 212 and gear 216 is described later), the engagement of that gear's teeth with the teeth of rack gear 218 causes side plate 220 and clamping rail 192 to slide along rail 196. The direction of sliding movement is governed by the direction of rotation of drive motor 212, which can be reversed, of course, depending on the need to move the workpiece 11 one way or the other.

Figure 10:
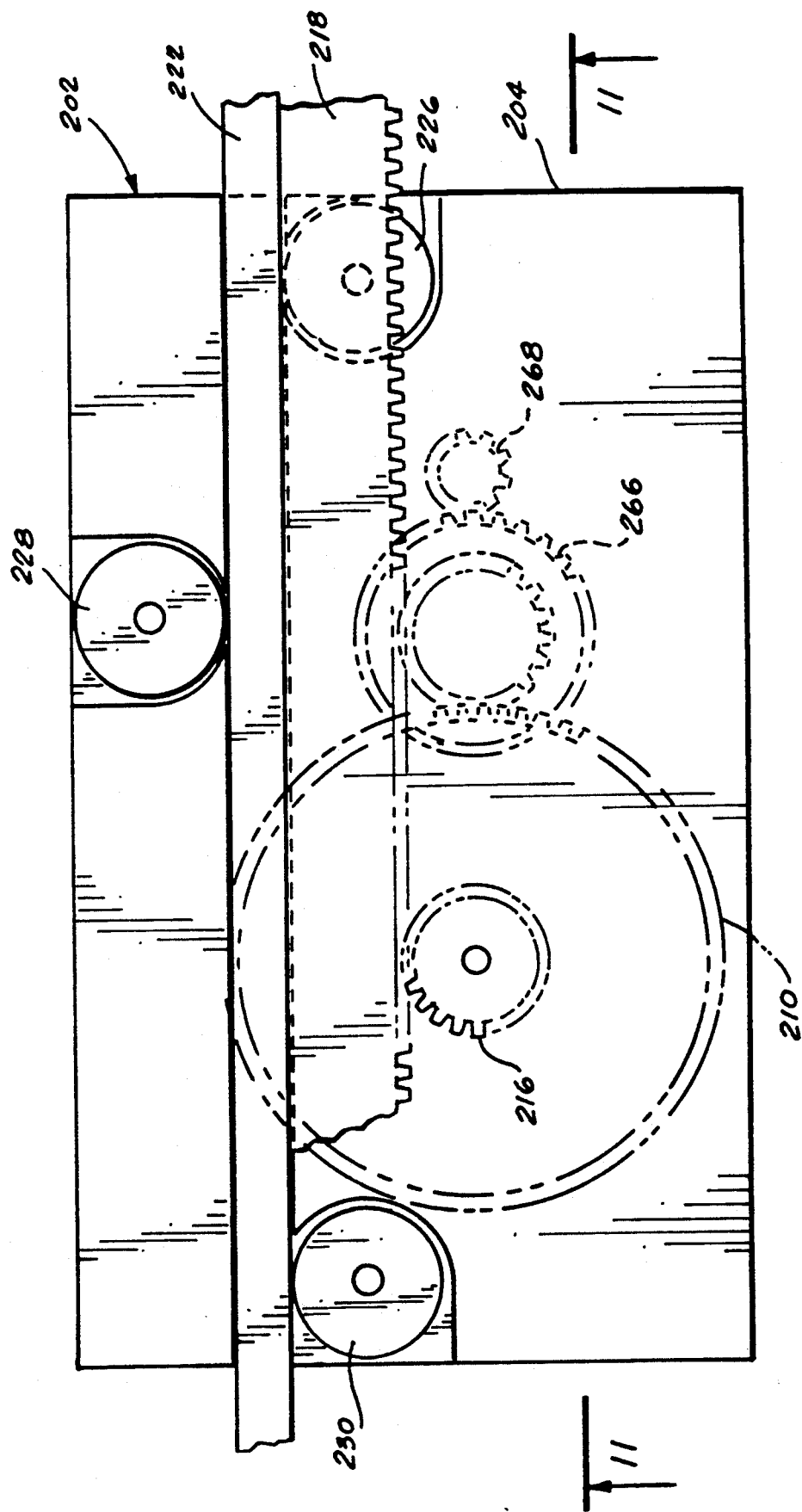
FIG. 10 is a bottom view of a servo-drive mechanism used to move the various carriage structures or carriages of the system shown in FIGS. 1-5.
Figure 12:
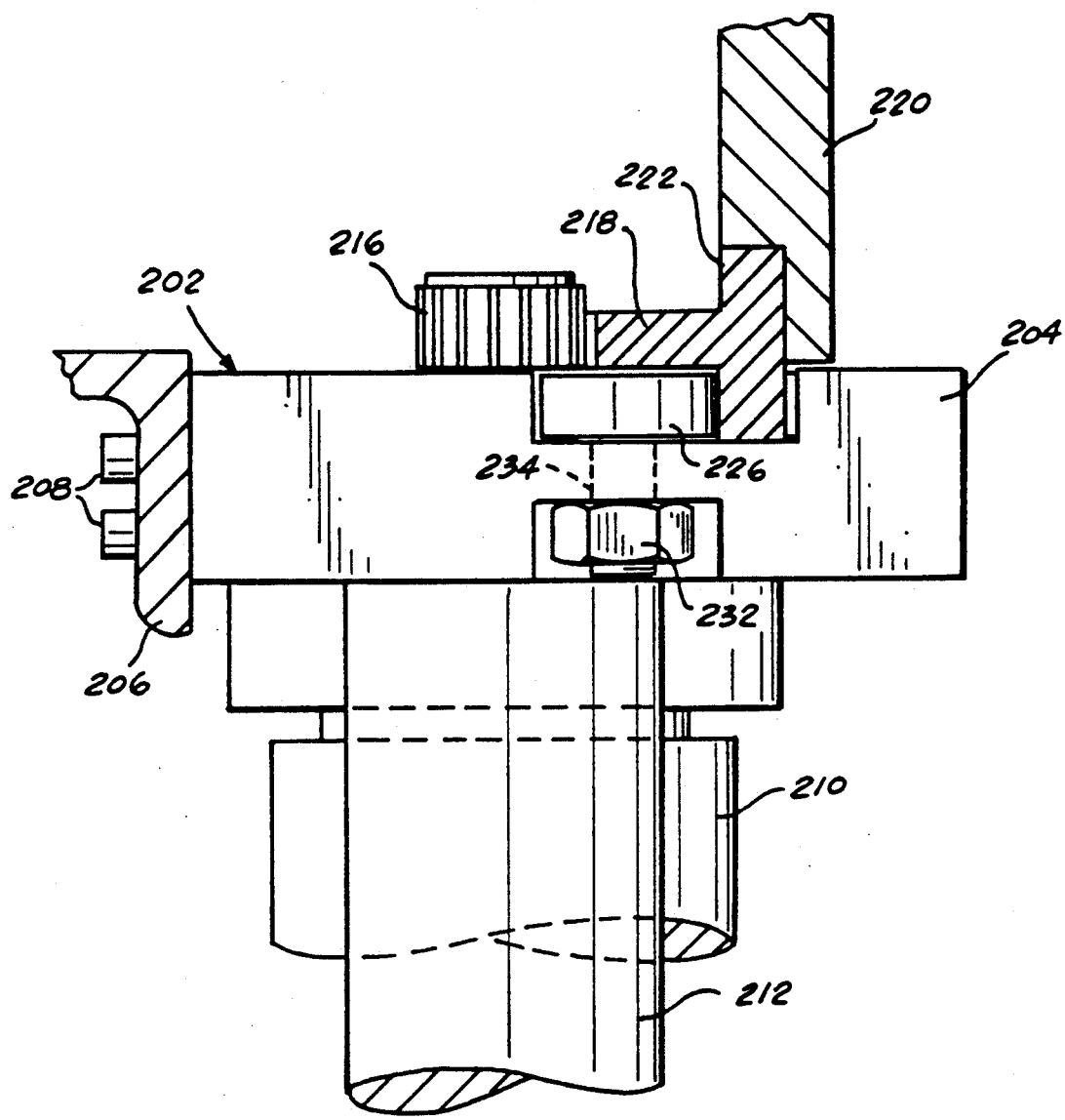
FIG. 12 is an end view of the servo-drive mechanism show in FIGS. 10 and 11.

The rack gear 218 has a precision ground plate 222 which makes up the base of such gear. One side of such plate 222 is received in a slot 224 in the pinion gear side of gear box 204. Referring to FIG. 10, which is a bottom view of a servodrive identical to the one shown in FIG. 18, but one that is located in another location of the system 10, received within the pinion gear side of gearbox 204 are three cam rollers 226, 228 and 230. Two of such rollers 226, 230 are on one side of rack gear base plate 222, while the third 228 is on the other side. The cam rollers 226, 228, 230 have eccentric stems that enable adjustment of the distances between their respective pinion gear's teeth 216 with those of the rack gear 218. This is best illustrated in FIG. 12, where it can be seen that loosening and tightening a nut 232, threaded onto roller shaft 234, permits spacial adjustment of the roller 226 relative to rack gear base plate 222.

The above-described arrangement for adjusting and maintaining the position of the pinion gear 216 relative to rack gear 218 is very important because it guarantees that each servodrive mechanism 202 used in system 10 will be highly accurate in moving system components, and will also be subjected to low wear over time. The wear on the flanks of gear teeth, whether it be the teeth of either one of the rack or pinion gears 218, 216, is very much dependent on the accuracy of contact. For example, if contact is exactly on the pith circle of the pinion gear 216, then only rolling contact occurs between its teeth and those of the rack gear 218, resulting in negligible wear and gear backlash. However, if the teeth are too far apart, both wear and backlash increases substantially. If too close, wear can be excessive.

A person skilled in the art would appreciate that the alignment between rack and pinion gears 218, 216 is important if it is a goal to use such a servodrive arrangement to control linear movements accurately. Motion forces are extremely high at the point of contact between the gears, and a small backlash error creates a proportionate linear motion error that equals or at least approximates the amount of backlash. The above-described cam rollers 226, 228, 230, including the way they may be adjusted relative to rack gear 218 (so that the base plate 222 of the rack gear is aligned in gear box slot 224), ensures that the contact between the gear teeth of the rack and pinion gears 218, 216 will be accurate and precise.

The above-described servodrive mechanism 202 requires that either the rack gear 218 or the gear box 204 be able to flex slightly in relation to the structure that supports the servodrive mechanism 202. This can be accomplished by either allowing the rack gear 218 to flex, or by providing flexing mounts for the servodrive gear box 204. This arrangement is best described by referring now to some of the other Figs. herein, which show servodrive mechanisms like the mechanism 202 shown in FIG. 18, but at other locations in the system 10.

Referring to FIG. 15, for example, which is a side view taken along line 15—15 in FIG. 4, there is shown two other servodrive mechanism 202a and 202b. Servodrive 202a moves tool carriage 28 back and forth along upper carriage beam rails 32, 34. Servodrive 202b moves the previously-described first machine tool support plate 46 vertically upwardly or downwardly along guide rails 54, 56. FIG. 13 further illustrates the position of servodrives 202a, 202b relative to each other, and relative to the system components which they move.

FIG. 17 is a top plan view of servodrive 202a shown in FIGS. 13 and 15. Connected to opposite ends 236, 238 of gear box 204 are a pair of mounting brackets 240, 242. These brackets 240, 242 are connected to gear box 204 by conventional machine screws 244. A recess 246 may be provided in each mounting bracket 240, 242 for providing access to the heads of the machine screws 244. The mounting brackets 240, 242 are further attached to the rear surface 49 of the previously-described first machine tool support plate 46. This is done via machine screws 248.

As is best seen in FIG. 15, the rack gear 218 for servodrive 202a is positioned below the servodrive's gearbox 204, and is mounted on top of the previously-described lower horizontally-extending beam 42, near the bottom of upper carriage beam 14. The means of attaching rack gear 218 to beam 42 is not specifically shown in the drawings. However, such attachment would be accomplished by machine screws or equivalent fasteners.

Referring again to FIG. 17, it is seen that the gear box 204 of servodrive 202a is preferably spaced a small distance from plate 46. This is indicated generally by arrow 250 in FIG. 17. The mounting brackets 240, 242 on opposite sides of the gear box 204 each have a flex-slot 252 which enables one side 240a, 242a of each bracket to bend or flex slightly with respect to the other side 240b, 242b. This, in turn, permits servodrive gear box 204 to flex relative to space 250 and rack gear 218. It is to be appreciated that such flexing is only in a direction that is normal to the axis of travel, which means that no degradation of performance is created by the 1 introduction of unwanted gear compliance.

Referring again to FIG. 15, the above-described flexing action is accomplished in a different manner for the servodrive mechanism 202b shown there. As is shown in FIG. 13, the rack gear 218 of servodrive 202b is aligned vertically, and is attached to the rear surface 68 of the tool carriage's second machine tool support plate 63. This is accomplished by a pin 252 that extends through co-axial bores 253 in both the lower end 254 of the rack gear and plate 63.

The gear box 204 of servodrive 202b is mounted to the tool carriage's first support plate 46. Referring to FIG. 15, it can be seen there that two plates 256, 258 mount gear box 204 to the rear surface 49 of plate 46 via machine screws 260.

The gear box 204 is preferably positioned in an opening 260 (see FIG. 13) through plate 46. This enables the pinion gear 216 of servodrive 202b to mesh such servodrive's vertically-extending rack gear 218, in the same manner as that which was previously described for the servodrive mechanism illustrated in FIG. 18. The pin-mounting arrangement of the rack 218 to the second plate 63 permits the rack to flex slightly as the servodrive 202b drives plate 63 upwardly or downwardly. This accomplishes the same effect as the flexing mounts 240, 242 previously described for servodrive 202a.

As should be apparent, servodrive 202a moves plate 46 horizontally along upper carriage beam 14. This, in turn, translates cutting tool 84 laterally between the table beams 18, 20 of the system 10. Servodrive 202b moves plate 63 upwardly or downwardly which, in turn, adjusts the vertical position of the cutting tool 84. Preferably, servodrive 202b will continually oscillate cutting tool 84 a short distance upwardly and downwardly during machining, so that tool wear and the heat generated by machining will be more evenly distributed along the length of the tool. This is further described later.

Like the servodrives 202a, 202b described for the tool carriage 28 of FIG. 13, the upper and lower clamp carriages 30, 170 (see FIG. 14, for example) have identical servodrives 202a, 202b for horizontal and vertical positioning of the upper and lower halves 133, 135 of the system's clamping mechanism 131. However, both clamp carriages 30, 170 have a third servodrive 202c which moves its respective half of clamping mechanism 131 transversely toward or away from upper and lower carriage beams 14, 16.

Servodrive 202c is identical in construction to servodrive 202b previously described, with the exception that the rack gear 218 of such servodrive 202c is horizontally and forwardly extending. Like the vertically-extending rack gear 218 shown in FIG. 13, the horizontally-extending rack gear of servodrive 202c is pin-mounted at one end to buttress support 129, so that it may flex. The gear box 204 of servodrive 202c extends through an opening 262 in the forward portion 110 of L-shaped plate 108. Such gear box is mounted to such portion 110 in the same manner that the gear box of servodrive 202b is mounted to plate 46 (see FIG. 15, for example).

Referring again to FIG. 11, each of the previously-described servodrives 202a, 202b, 202c has a servomotor 212 along with its encoder 210. Connected to shaft 214, inside gearbox 204, is a circular gear 264 that is rotationally driven by an intermediate gear 266. The latter gear 266 is in turn driven by a third gear 268 that is attached to the shaft 270 of motor 212. The encoder 210 provides an electrical signal indicating the amount of rotation of shaft 214, which directly indicates the linear movement of gear box 204 relative to rack gear 218. This correspondingly provides a measure of the linear movement of any system component that is driven by a servodrive 202.

It should be appreciated that the previously-described drive motor 150 in FIG. 14, which drives ring gear 144 in rotation, operates similarly to the servodrives just described, although the driven motion is circular instead of linear. The purpose of drive motor 150 is to rotationally position the pressure foot 134 of both the upper and lower clamp carriages 30, 170. Such positioning depends on the profile of the given part 184 which is being cut from workpiece 11 at any one time.

Figure 19:
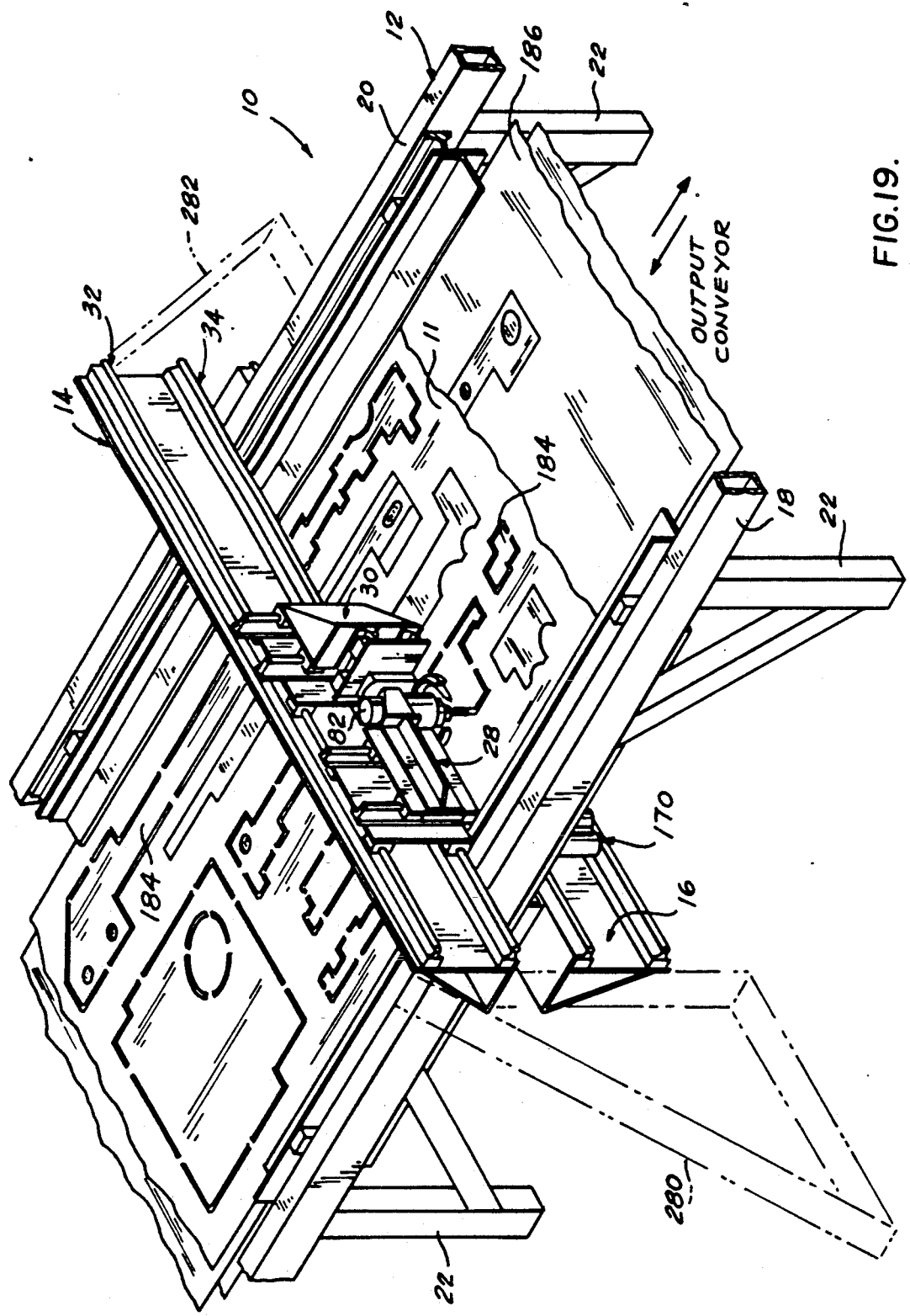
FIG. 19 is another pictorial view of a sheet metal part machining system in accordance with the invention, and is similar to FIG. 1, but shows a slightly different embodiment where output conveyors are positioned below the workpiece.

FIG. 19 better illustrates the wide variety of parts 184 which can be machined by the system 10. It also shows a preferable location for an output conveyor 186 below the workpiece 11. A close review of the embodiment shown in FIG. 19 reveals that some of the above-described plates and brackets have been altered in size and shape, although all are substantially equivalent to the various parts described in FIGS. 1-18.

The reader will appreciate that it may be desirable to provide side buttresses at opposite ends 280, 282 of the upper and lower carriage beams 14, 16. In other words, such buttresses would extend from the ends of the beams 14, 16 down to the floor, and prevent or dampen vibration of the table 12 during a machining operation. This may or may not be necessary, depending on the size and mass of the beams 14, 16, 18, 20 and carriages 28, 30, 170 carried thereby, after the system 10 has been finally constructed. Consequently, such buttresses are shown only in dashed lines in FIG. 19.

II. System Operation

Figure 2:
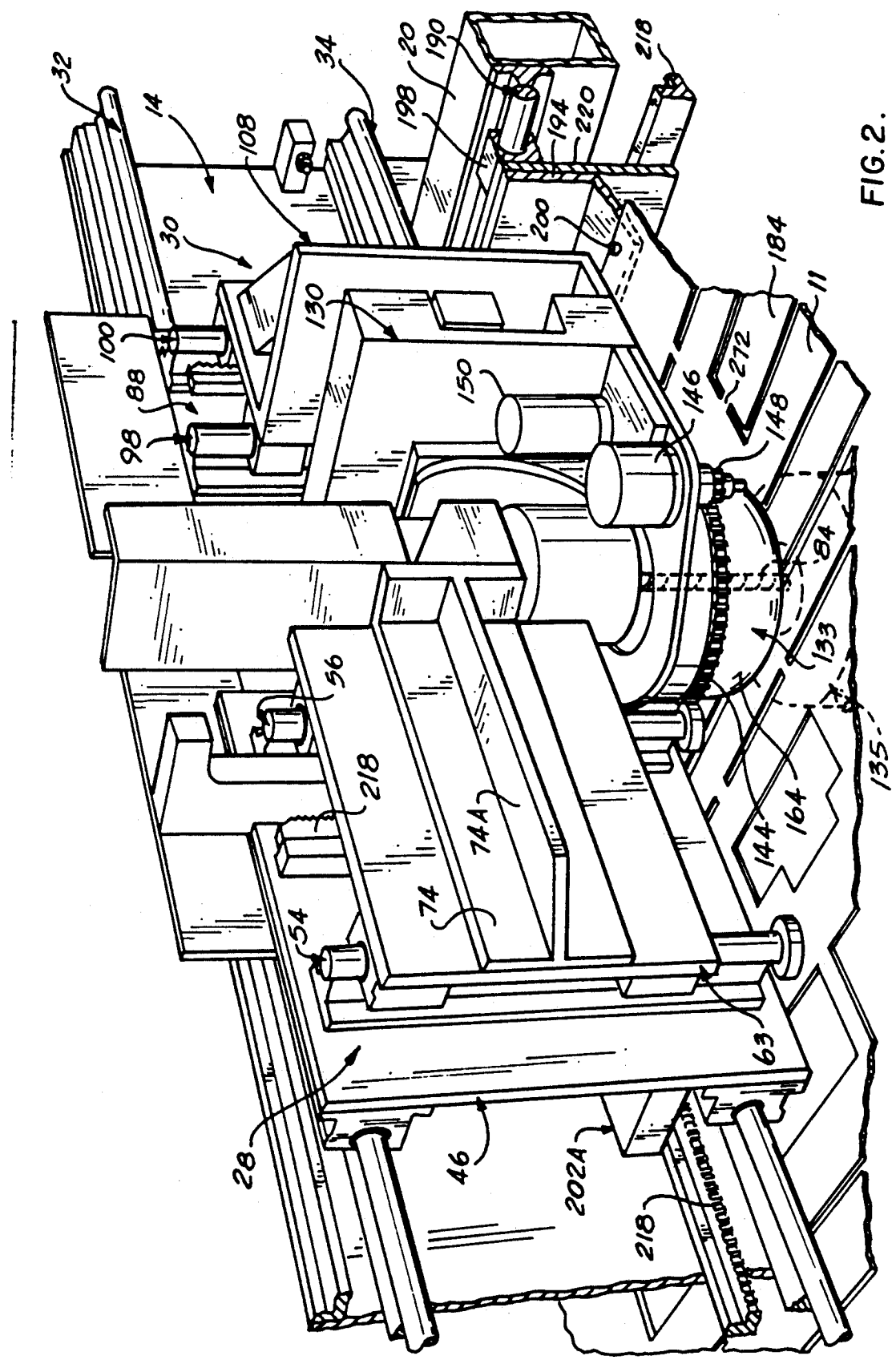
FIG. 2 is an enlarged pictorial view of an upper carriage beam, and associated carriage structures, of the machining system shown in FIG. 1.

When a part is cut from workpiece 11, exemplary profiles of which are shown in FIGS. 1 and 2, the upper and lower halves 133, 135 of clamp mechanism 131 are separated slightly so that air bearings 176 of pressure feet 134 are spaced slightly from the workpiece. Cutting lubrication mist, if needed, is supplied through hose 182a. Pressurized air is fed through the hoses 182b of the pressure feet 134, which creates an air bearing that supports the workpiece or sheet 11 between the pressure feet 134. This permits feet 134 to move, as needed, relative to the sheet 11 without scraping its surfaces 178, 180 during a cutting or machining operation.

The drive motor 150 of each half of clamping mechanism 131, rotates each turret 136 and pressure foot 134, and is controlled so that the pressure feet remain approximately perpendicular to the contour of the part as it is cut from sheet 11. During the course of cutting a part, one or more tabs 272 may be left in place at certain locations around the part's profile (see FIG. 2). These hold the part in the sheet 11 while most of the part's profile is cut. After this is done, any tabs holding the part to the sheet are cut so that the part can be placed upon conveyor 186 (see FIG. 8). When tabs are cut, the part needs to be held firmly by clamping feet 134, in order to avoid any dislocation caused by cutter forces. In order to accomplish this, the upper pressure foot 134 is preferably driven downward against the sheet 11 adjacent the tab to be cut with a certain preset pressure. Air pressure through hoses 182b is turned off during such operation, and the clamp carriage servodrives 202 are programmed to move in a manner so that the pressure feet 134 move correspondingly with sheet movement as the tab is cut. The cutting tool 84 moves independently of clamp carriage movement and cuts the tab.

After the last tab 272 holding any given part 184 is cut, the part is then entirely free from the sheet 11, and may be placed on output conveyor 186 (see FIGS. 6-9). As previously described, this is done by supplying a vacuum through hose 182b to the upper of pressure foot 134, and the vertical servodrives 202 in carriages 30, 170, which control the vertical position of pressure feet 134, thereby moving them downwardly. The lower pressure foot 134 is moved further down than the upper pressure foot, in order to provide a gap for placing part 184 on output conveyor 186. It may be desirable that conveyor 186 is also movable in order to facilitate placement of part 184 thereon. The machinery for moving conveyor 186 is not described here, however.

Some parts may be very long, such that they sag downwardly when held by only one tab. In such cases, it would be important to have a movable conveyor whose motion is coordinated with motion of the cut part as it is removed from sheet 11.

The profiles of individual parts out by the system 10 are cut in accordance with software control. In other words, each servodrive 202 of the system 10 is individually controlled by a computer or microprocessor that operates all servodrives cooperatively to cut individual parts from sheet 11. Cutting different part types is therefore simply a matter of altering part data in software, but otherwise requires no new hardware set-up or modification.

III. Software Control

The required software control for the system 10 will now be briefly summarized in order to better understand the invention. Such control involves three levels of control, which are generally referred to in the field as cell, workstation and machine-control levels.

The cell control level involves coordinating the system 10 and any other systems used in conjunction with the system 10. The latter might include, for example, information or data that orders the system 10 to produce certain numbers of a particular part, and also supplies the system's computer with program data for such parts.

The work station control level monitors the operation of the system 10, and controls it in many ways that are similar to the way a manual operator might control an equivalent system. This particular control level requires software unique to the system 10 as described here that can create machine control data (MCD) for the various machine axes described above.

The machine control level handles all time-critical tasks of the system 10, such as interpolation, servoloop control, cutter force monitoring, etc. The control level is, in many ways, like a conventional CNC system, but must be configured differently in order to meet the unique requirements of the system 10 described above.

It is to be appreciated that a person skilled in the art could develop many different kinds of software packages that would be equally suitable to control the system 10. However, presented below are certain software programming requirements which should be a part of any software control in the work station and machine control levels.

Key features which the software in the work station level should have are (a) cutter centerline (CCL) data from part periphery (PERTOCL); and (b) machine control data (MCD) from centerline and tab specification (TABS). The software in the machine control level should include the following features: (a) at least sixteen axes of linear interpolation, or combined circular and linear interpolation; (b) less than 1.0 millisec. interpolation and servodrive update time; (c) velocity and acceleration feed forward, with zero following error; (d) ramp up acceleration and/or deceleration; (e) communication with work station commands so that machine control is accomplished in accordance with such commands; (f) cutter side load monitoring and feed override; and (g) servo and cutter overload protection, i.e., feed shut-down.

The cutter centerline (CCL) from part periphery portion of the software should use as input data a set of line and circle arcs to define the net periphery of any given part to be machined from sheet 11. This data could be retrieved from CAD data bases, for example, where similar formats have been used and are currently available. It is important that the diameter of the cutter 84 be known, as it is required before any centerline data can be calculated. This portion of the software should generate a different set of lines and arcs around the part to be out, along which the cutter 84 must move in order to cut the part's net shape.

The MCD from centerline and tab specification portion of the software should calculate the end points of all lines and circle arcs for all axes of the system 10. The CCL data described above should contain basically X and Y end points of lines along the profile. However, movements of the cutting tool 84 and clamp mechanism 131 are affected by the locations of tabs, and the order in which they are to be cut off. This should be originally decided by a part programmer or planner, who must create the software in such a manner that it defines the type of processing of each tab for each part. By way of example, the code set forth below could be used to define the order of cutting tabs:

00: Last tab to be cut, skip over in first pass
01: Cut through in the first pass without clamping
02: Cut through in first pass with clamping
04: Next to last tab to be out, reposition then to last tab The software must also handle linear and circular interpolations for the various axes of system movement. As the skilled person would know, linear interpolation involves the capability to calculate intermediate positions on a path of travel between starting and ending points. Preferably, these two points would be defined by MCD as described above. Start and end points should be calculated so that coordinated motions will occur. That is, all axes should arrive at their end point at the same instant in time.

Circular interpolation causes an axis pair (X,Y, for example) to move in a circular arc, which may include a full revolution. The MCD would define direction of motion (clockwise or counter clockwise), center point of the arc, and arc end point from which intermediate points along the arc can be calculated. Linear interpolation should be carried out simultaneously with circular interpolation so that all axes, whether or not circular, arrive at their respective end points at the same time.

In higher than normal speed machining, it is generally important to create a short time interval between two consecutive calculations of the points along the cutting path. This is particularly important if circular interpolations are used, where the cut follows an arc, and the profile has a tight radius. For example, in the system 10 described here, a 90 degree outside corner with a 0.25 inch radius can be cut in 100 to 200 millisec. By way of comparison, it would take a conventional machine one sec. or longer to make such a cut. A long time interval between calculation points would create a polygon-shaped profile instead of the circular arc desired.

Not only must the software provide or calculate position command data, but it must also provide or calculate velocity and acceleration control commands for the axes which drive the cutter 84. Velocity and acceleration feed-forward signals must be provided by the software in order to reduce servodrive following errors. Conventional CNC systems typically allow actual machine position to lag behind computer position by a certain amount, typically one inch at 400 inches per minute of axis feed rate. This error is inversely proportionate to the gain in the control loop or loops for machine position, and even a small gain variation of 1% can cause an error of approximately 0.01 inches. This is totally unacceptable when cutting at high feed rates. Another deficiency of CNC systems is that dynamic errors are typically too large during periods of aggressive acceleration and deceleration, which often happens when corners are cut. The software must therefore continually calculate velocity and acceleration values that are fed as input commands to the various above-described servodrives 202. These must function to reduce velocity and acceleration errors close to zero, without having an impact on the stability of servoloop control.

Another deficiency of conventional CNC systems is that they typically start and stop motion with velocity ramps, i.e., a constant positive or negative acceleration value is suddenly applied at start and stop points, respectively. This has an undesirable effect on the structure of the machine in that it causes the machine to oscillate at its resonant frequency after the force of impact. If the force instead is gradually applied, the machine structure can flex correspondingly, and then relax back as the force is gradually removed during the latter half of an acceleration or deceleration phase. Software control of the system 10 should therefore ramp up acceleration to a peak, and then down to zero, by a rate so that the highest values can be used during non-critical positioning moves. This method reduces unwanted shocks in the system's servodrives which could otherwise cause unreliable performance.

The system 10 should require no operator for loading programs, or loading and unloading parts, or changing tools. Software control in the work-station control should perform all these functions, as well as generate MCD for each sheet 1 to be processed or machined. Data sent to the machine control level are typically the MCD, start and stop commands for various cutting operations, part load or unload, part profiling, etc.

Preferably, the machine control level should include an adaptive control loop which can override the programmed feed rate of the cutting tool 84 so that forces on the sheet 11 are kept within preset limits. Such limits may vary from part to part even though such parts are machined from the same sheet This could be accomplished by sensors on the spindle housing as described in one of my earlier patents (U.S. Pat. No. 4,698,773). Lastly, in spite of all efforts to foresee every possible problem, sooner or later a mistake will occur where a motion axis is programmed erroneously so that one of the above-described system components, i.e., tool carriage 28, clamp carriage 30, lower clamp carriage 170, collides with another. It is very important that the system 10 shuts itself down in order to minimize such damage. For this reason, the software control should be equipped with some sort of monitoring device for all servodrive mechanisms 202, in order to monitor electrical currents supplied to such mechanisms and also monitor cutter side load signals. Should any of these fall outside of certain normal values, the software should automatically shut the system 10 down.

The preceding description sets forth the best mode for carrying out the invention claimed below, at least as it is currently known to the inventor. It is to be appreciated that certain changes could be made to the system 10 described above without departing from the overall spirit and scope of what is considered to be the invention. Any patent protection granted the inventor, or any assignee of the inventor, is therefore not necessarily to be limited by the preceding description. Instead, such patent protection or coverage is to be limited only by the patent claim or claims which follow, after the interpretation of such is made in accordance with the well-established doctrines of patent claim interpretation.

What is claimed is:

1. A machining station for machining parts from a sheet metal workpiece, comprising:
   a pair of parallelly-spaced table beams for supporting said sheet metal workpiece therebetween;
   an upper carriage beam, positioned transversely across said table beams in a manner so that said upper carriage beam is positioned above said workpiece;
   a spindle carriage mounted to said upper carriage beam, in a manner so as to be movable therealong, said spindle carriage carrying a cutting tool that is operable to machine said sheet metal workpiece, and said spindle carriage being further operable to vertically adjust the position of said cutting tool relative to said workpiece;
   an upper clamp carriage also mounted to said upper carriage beam, but in a manner so as to be movable along said carriage beam independently of the movement of said spindle carriage, said upper clamp carriage carrying a downwardly-thrusting clamping tool that is operable to stabilize the position of at least a portion of said workpiece relative to said machine tool from a location above said workpiece;
   a lower carriage beam, also positioned transversely across said table beams, but in a manner so as to be normally below said workpiece; and
   a lower clamp carriage mounted to said lower carriage beam, in a manner so as to be movable along said lower carriage beam independently of the movement of said spindle carriage and said clamp carriage which are mounted to said upper carriage beam, said lower clamp carriage carrying an upwardly-thrusting clamping tool that is operable to stabilize said workpiece from a position that is below the same.

2. The system of claim 1, wherein said upper carriage beam includes a pair of parallel, horizontally extending guide rails, said guide rails extending along substantially the length of said upper carriage beam, and wherein said spindle carriage includes:
   a first machine tool support member that is generally vertically upstanding, and is slidingly mounted to said horizontally extending parallel guide rails, and
   horizontal rack and pinion gear drive means for drivingly moving said first machine tool support member horizontally along said guide rails, for corresponding adjustment of the position of said cutting tool relative to said sheet metal workpiece, and
   a pair of generally vertically extending guide rails mounted to said first machine tool support member, and
   a second machine tool support member slidingly mounted to said vertically extending guide rails, and
   vertical rack and pinion gear drive means for drivingly moving said second machine tool support member vertically along said first machine tool support member, for corresponding vertical adjustment of the position of said cutting tool relative to said sheet metal workpiece.

3. A machining station for machining parts from a sheet metal workpiece, comprising:
   a pair of parallelly-spaced table beams for supporting said sheet metal workpiece therebetween;
   an upper carriage beam, fixedly connected to said table beams, and positioned transversely across said table beams, in a manner so that said upper carriage beam is normally positioned above said workpiece, said upper carriage beam including at least one horizontally-extending guide rail, said guide rail extending along substantially the length of said upper carriage beam;
   a spindle carriage mounted to said upper carriage beam, in a manner so as to be movable therealong, said spindle carriage carrying a cutting tool that is operable to machine said sheet metal workpiece, and said spindle carriage being further operable to adjust the position of said cutting tool relative to said workpiece;
   an upper clamp carriage also mounted to said upper carriage beam, but in a manner so as to be movable along said carriage beam independently of the movement of said spindle carriage, said upper clamp carriage carrying a downwardly-thrusting clamping tool that is operable to stabilize the position of at least a portion of said workpiece relative to said machine tool from a location above said workpiece, said upper clamp carriage further including a first clamp support member that is generally vertically upstanding and slidingly mounted to said horizontally extending guide rail, and horizontal rack and pinion gear drive means for horizontally moving said first clamp support member along said guide rail, for corresponding adjustment of the position of said downwardly-thrusting clamping tool relative to said sheet metal workpiece, and a pair of parallel, but vertically extending guide rails mounted to said first clamp support member, and a second clamp support member slidingly mounted to such vertically extending guide rails, and vertical rack and pinion gear drive means for drivingly moving said second clamp support member along such vertically extending guide rails, for corresponding vertical adjustment of the position of said downwardly-thrusting clamping tool relative to said sheet metal workpiece, and still another pair of parallel guide rails, mounted to said second clamp support member, and extending transversely relative to said horizontally and vertically extending guide rails, and a third clamp support member slidingly mounted to such transversely extending guide rails, and transverse rack and pinion gear drive means for drivingly moving said third clamp support member along such transversely extending rails, for corresponding transverse adjustment of the position of said downwardly-thrusting clamping tool relative to said workpiece;
   a lower carriage beam, also positioned transversely across said table beams, but in a manner so as to be normally below said workpiece; and
   a lower clamp carriage mounted to said lower carriage beam, in a manner so as to be movable along said lower carriage beam independently of the movement of said spindle carriage and said clamp carriage which are mounted to said upper carriage beam, said lower clamp carriage carrying an upwardly-thrusting clamping tool that is operable to stabilize said workpiece from a position that is below the same.

4. The machining station of claim 3, including a generally horizontal plate connected to said third clamp support member of said upper clamp carriage, said horizontal plate carrying said downwardly-thrusting clamping tool, and having an opening for permitting said cutting tool to pass therethrough.

5. The machining station of claim 4, wherein said downwardly-thrusting clamping tool includes a downwardly depending pressure foot having air bearing means for stabilizing said workpiece.

6. The machining station of claim 3, wherein said lower carriage beam includes at least one horizontally-extending guide rail, said guide rail extending along substantially the length of said lower carriage beam, and wherein said lower clamp carriage further includes:

a first lower clamp support member that is generally vertically upstanding and slidingly mounted to said at least one horizontally-extending guide rail of said lower carriage beam, and horizontal rack and pinion gear drive means for horizontally moving said first lower clamp support member along such guide rail, for corresponding adjustment of the position of said upwardly-thrusting clamping tool relative to said sheet metal workpiece, and a pair of parallel, but vertically-extending guide rails mounted to said first lower clamp support member, and a second lower clamp support member slidingly mounted to such vertically-extending guide rails, and vertical rack and pinion gear drive means for drivingly moving said second lower clamp support member along such vertically-extending guide rails, for corresponding vertical adjustment of the position of said upwardly-thrusting clamping tool relative to said sheet metal workpiece, and still another pair of parallel guide rails, mounted to said second lower clamp support member, and extending Transversely relative to said lower carriage beam's horizontally-extending guide rails and said first lower clamp support member's vertically-extending guide rails, and a third lower clamp support member slidingly mounted to such transversely-extending guide rails, and transverse rack and pinion gear drive means for drivingly moving said third lower clamp support member along such transversely extending rails, for corresponding transverse adjustment of the position of said upwardly-thrusting clamping tool relative to said workpiece.

7. The machining station of claim 6, including a generally horizontal plate connected to said third lower clamp support member of said lower clamp carriage, such horizontal plate carrying said upwardly-thrusting clamping tool, wherein said upwardly-thrusting clamping tool includes an upwardly-thrusting pressure foot having air bearing means for stabilizing said workpiece from below said workpiece.

8. The machining station of claim 4, wherein said downwardly-thrusting clamping is rotatably mounted to said horizontal plate.

9. The machining station of claim 7, wherein said upwardly-thrusting clamping tool is rotatably mounted to said horizontal plate.

10. A machining station for machining parts from a sheet metal workpiece, comprising:

a pair of parallelly-spaced table beams for supporting said sheet metal workpiece therebetween;

an upper carriage beam, fixedly mounted to said table beams and positioned transversely across said table beams, in a manner so that said beam is normally positioned above said workpiece;

a spindle carriage mounted to said upper carriage beam, in a manner so as to be movable therealong, said spindle carriage carrying a cutting tool that is operable to machine said sheet metal workpiece, and said spindle carriage being further operable to vertically adjust the position of said cutting tool relative to said workpiece;

an upper clamp carriage also mounted to said upper carriage beam, but in a manner so as to be movable along said carriage beam independently of the movement of said spindle carriage, said upper clamp carriage carrying a downwardly-thrusting clamping tool that is operable to stabilize the position of at least a portion of said workpiece relative to said machine tool from a location above said workpiece;

a lower carriage beam, also fixedly connected to said table beams and positioned transversely across said table beams, but in a manner so as to be normally below said workpiece;

a lower clamp carriage mounted to said lower carriage beam, in a manner so as to be movable along said lower carriage beam independently of the movement of said spindle carriage and said clamp carriage which are mounted to said upper carriage beam, said lower clamp carriage carrying an upwardly-thrusting clamping tool that is operable to stabilize said workpiece from a position that is below the same; and further including a clamping rail slidably mounted to each table beam, for gripping one side of said workpiece, said clamping rails cooperatively suspending said workpiece both across the space defined between said table beams and between said upper and lower carriage beams, and a separate clamp rail rack and pinion gear drive means for driving each clamping rail relative to its respective table beam, and for adjustably moving each clamping rail along at least part of the length of its respective table beam, to correspondingly move said workpiece relative to said upper and lower carriage beams during a machining operation, each clamp rail rack and pinion gear drive means having its own drive motor that is independently operable relative to the drive motor of the other clamp rail rack and pinion gear drive means, so that each clamp rail rack and pinion gear drive means is independently operable of the other.

11. The machining station of claim 2, wherein both said horizontal and vertical rack and pinion gear drive means include an elongated rack gear, and a drive motor having a pinion gear in driving engagement with said rack gear.

12. The machining station of claim 3, wherein each one of said horizontal, vertical and transverse rack and pinion gear drive means includes an elongated rack gear, and a drive motor having a pinion gear in driving engagement with said rack gear.

13. The machining station of claim 6, wherein each one of said horizontal, vertical and transverse rack and pinion gear drive means includes an elongated rack gear, and a drive motor having a pinion gear in driving engagement with said rack gear.

14. The machining station of claim 2, including means for counter balancing the weight of said second machine tool support member.

15. The machining station of claim 14, wherein said counter balancing means comprises a spring.

16. The machining station of claim 3, including means for counter balancing the weight of said second clamp support member.

17. The machining station of claim 16, wherein said counter balancing means comprises a spring.

18. The machining station of claim 6, including means for counter balancing the weight of said second lower clamp support member.

19. The machining station of claim 18, wherein said counter balancing means includes an air piston operative to push against the weight of said second lower clamp support member.

20. The machining station of claim 4, including a ring gear connected to said downwardly-thrusting clamping tool, and a drive motor connected to said horizontal plate, said drive motor being in operative engagement with said ring gear.

21. The machining station of claim 7, including a ring gear connected to said upwardly-thrusting clamping tool, and a drive motor connected to said horizontal plate, said drive motor being in operative engagement with said ring gear.

22. A machining station for machining parts from a sheet metal workpiece, comprising:
a pair of parallely-spaced table beams for supporting said sheet metal workpiece therebetween;
an upper carriage beam, positioned transversely across the table beams in a manner so that said upper carriage beam is positioned above the location of said workpiece;
an upper carriage mounted to said upper carriage beam, in a manner so as to be movable along said carriage beam, said upper carriage carrying a downwardly-thrusting clamping tool that is operable to stabilize said workpiece from above said workpiece;
a lower carriage beam, also positioned transversely across said table beams, but in a manner so as to be below the location of said workpiece; and
a lower carriage mounted to said lower carriage beam, in a manner so as to be movable along said lower carriage beam independently of the movement of said upper carriage, said lower carriage carrying an upwardly-thrusting clamping tool that is operable to stabilize said workpiece from below the same.

23. The machining station of claim 22, including a spindle carriage mounted to one of said upper and lower carriage beams, in a manner so as to be movable along the beam to which it is mounted, said spindle carriage carrying a cutting tool that is operable to machine said sheet metal workpiece, and said spindle carriage being further operable to adjust the position of said cutting tool relative to said workpiece.

24. The machining station of claim 23, wherein said spindle carriage is mounted to said upper carriage beam, and is independently movable relative to the movement of both said upper and lower carriages.

25. The machining station of claim 22, including a clamping rail slidably mounted to each table beam, for gripping one side of said workpiece, said clamping rails cooperatively suspending said workpiece both across the spaced defined between said table beams and between said upper and lower carriage beams, and a separate clamp rail rack and pinion gear drive means for driving each clamping rail relative to its respective table beam, and for adjustably moving each clamping rail along at least part of the length of its respective table beam, to correspondingly move said workpiece relative to said upper and lower carriage beams during a machining operation, each clamp rail rack and pinion gear drive means having its own drive motor that is independently operable relative to the drive motor of the other clamp rail rack and pinion gear drive means, so that each clamp rail rack and pinion gear drive means is independently operable of the other.

* * * * *

UNITED STATES PATENT AND TRADEMARK OFFICE
CERTIFICATE OF CORRECTION

PATENT NO. : 5,088,181

DATED : February 18, 1992

INVENTOR(S) : Jan Jeppsson

Page 1 of 2

It is certified that error appears in the above-identified patent and that said Letters Patent is hereby corrected as shown below:

Column 6, line 64, "show" should be -- shown --.
Column 7, line 8, after "line", add -- 15--15 in Fig. 4 --.
Column 7, line 33, "table !2" should be -- table 12 --.
Column 8, line 54, "beam !4" should be -- beam 14 --.
Column 8, line 65, "system !0" should be -- system 10 --.
Column 9, line 63, "Horizontal" begins a new paragraph.
Column 10, line 20, "One difference" begins a new paragraph.
Column 10, line 64, "out" should be -- cut --.
Column 11, line 17, "out" should be -- cut --.
Column 13, line 10, "mechanism" should be -- mechanisms --.
Column 13, line 49, delete "1".
Column 16, line 1, "out" should be -- cut --.
Column 17, in line 2 and line 20, "out" should be -- cut --.
Column 18, line 31, "sheet 1" should be -- sheet 11 --.
Column 18, line 40, "sheet" should be -- sheet 11 --.
Column 18, line 41, "This" does not begin a new paragraph.
Claim 3, column 19, line 67, "parallely" should be -- parallelly -.

UNITED STATES PATENT AND TRADEMARK OFFICE
CERTIFICATE OF CORRECTION

PATENT NO. : 5,088,181

DATED : February 18, 1992

INVENTOR(S) : Jan Jeppsson

It is certified that error appears in the above-identified patent and that said Letters Patent is hereby corrected as shown below:

Claim 6, column 21, line 38, "Transversely" should be
   -- transversely --.

Claim 8, column 21, line 60, insert -- tool -- after "clamping".

Claim 22, column 23, line 30, "parallely" should be - parallelly -.

Signed and Sealed this

Tenth Day of August, 1993

Attest:

MICHAEL K. KIRK

Attesting Officer

Acting Commissioner of Patents and Trademarks